United States Patent
Hashimoto et al.

(10) Patent No.: US 7,269,480 B2
(45) Date of Patent: Sep. 11, 2007

(54) MOBILE ROBOT

(75) Inventors: Sachie Hashimoto, Wako (JP); Satoki Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/636,696

(22) Filed: Dec. 11, 2006

(65) Prior Publication Data

US 2007/0150106 A1 Jun. 28, 2007

(30) Foreign Application Priority Data

Dec. 12, 2005 (JP) .............................. 2005-358316

(51) Int. Cl.
*G05B 15/00* (2006.01)
*G05B 19/00* (2006.01)

(52) U.S. Cl. .................. 700/259; 700/245; 700/247; 700/248; 700/251; 700/257; 700/258; 700/260; 700/261; 700/262; 700/264; 318/568.11; 318/568.12; 318/568.13; 318/568.16; 318/568.21; 600/117; 600/118; 606/1; 606/102; 606/130; 901/1; 901/2; 901/27

(58) Field of Classification Search .................. 700/259
See application file for complete search history.

(56) References Cited

U.S. PATENT DOCUMENTS

| | | | |
|---|---|---|---|
| 6,247,623 B1 * | 6/2001 | Walters ....................... 224/255 |
| 6,289,265 B1 * | 9/2001 | Takenaka et al. ........... 700/245 |
| 6,401,846 B1 | 6/2002 | Takenaka et al. |
| 6,697,709 B2 * | 2/2004 | Kuroki et al. ............... 700/259 |
| 6,802,382 B2 * | 10/2004 | Hattori et al. ............... 180/8.6 |
| 7,158,859 B2 * | 1/2007 | Wang et al. ................. 700/245 |
| 2004/0199292 A1 | 10/2004 | Sakagami et al. |
| 2005/0218292 A1 | 10/2005 | Kawabe et al. |

FOREIGN PATENT DOCUMENTS

JP  2001-129787  4/2001

OTHER PUBLICATIONS

Peters et al., Robonaut task learning through teleoperation, 2003, IEEE, p. 2806-2811.*
Hagita et al., Collaborative capturing of experiences with ubiquitous sensors and communication robots, 2003, IEEE, p. 4166-4171.*

* cited by examiner

*Primary Examiner*—Thomas Black
*Assistant Examiner*—McDieunel Marc
(74) *Attorney, Agent, or Firm*—Squire, Sanders & Dempsey L.L.P.

(57) ABSTRACT

A mobile robot which has a communication with a detection target by a motion of the mobile robot or by an utterance from the mobile robot, the mobile robot includes: a personal identification unit detecting an existence of the tag based on a signal transferred from the tag and obtaining the identification information stored on the tag; a position information acquisition unit obtaining distance information indicating a distance from the mobile robot to the detection target; a locomotion speed detection unit detecting a locomotion speed of the mobile robot; a personal information acquisition unit acquiring personal information based on the identification information; a communication motion determination unit determining contents of a communication motion based on the personal information; and an operation determination unit adjusting a start timing of each content of the communication motion based on distance information and on the locomotion speed of the mobile robot.

6 Claims, 18 Drawing Sheets

MOBILE ROBOT

BACKGROUND OF THE INVENTION

1. Field of the Invention

The present invention relates to a mobile robot which specifies the ID of a person with a detection tag represented by a RFID (Radio Frequency Identification) tag, and which has a communication with the person with the detection tag based on personal information associated with the ID.

2. Description of Relevant Art

Recently, researches and development of an autonomous mobile robot have been made intensively. Especially, the researches and development about a robot, which is so-called as a bipedal walking mobile robot, attract a lot of attentions.

Additionally, researches and development about a voice reorganization apparatus, which recognizes a voice of a person and converts the voice into a text, and a voice synthesis apparatus, which performs a voice synthesis and outputs a synthesized voice, have been made. Thus, a voice reorganization apparatus and a voice synthesis apparatus are just becoming employed in various kinds of apparatus. Also, a mobile robot, which has a voice reorganization apparatus and a voice synthesis apparatus and which is adapted to have a conversation with a person, has been investigated intensively.

If the robot is requested to have a friendly communication with a person using a motion, e.g. gesture, a hand gesture, a hand language and etc., and a voice, the robot has to start appropriate conversation and motion at a suitable timing, based on personal information of the person, when the robot R passes by a person in the course of travel.

Therefore, various kinds of apparatus and method for identifying the person who communicates with the robot are proposed. Here, the techniques disclosed in Japanese unexamined patent publication JP2004-299025 (US2004/199292 and JP2001-129787 have been discovered as examples of conventional techniques.

In the case of the invention disclosed in JP2004-299025, the recognition of the person is performed by extracting a contour of a person from an image obtained by an image pickup using cameras.

In the case of the invention disclosed in JP2001-129787, a robot which greets a person who has an ID apparatus, e.g. a wireless badge, with calling the name of the person is disclosed.

In the case of the invention disclosed in JP2004-299025, since image recognition processing is used to identify a person, an appreciable time is required for achieving the identification of the person. In this case, therefore, it is hard for the robot to have a communication with a person at suitable timing when the robot passes by a person.

Additionally, in the case of the invention disclosed in JP2001-129787, the robot greets a person who has an ID apparatus, e.g. a wireless badge, with calling the name of the person. But a technical disclosure about how to start a communication with a person at a suitable timing does not exist therein.

Therefore, a mobile robot, which obtains information relating to a person when the robot communicates with the person, and which has a communication with the person using a motion of a body or voice message, has been required. Especially, a mobile robot, which has a communication with the person at a suitable timing determined in consideration of the locomotion speed of the mobile robot, has been required.

SUMMARY OF THE INVENTION

The present invention relates to a mobile robot which receives a wireless signal transmitted from a tag on which identification information is stored and communicates with a detection target provided with the tag by a predetermined motion of the mobile robot or by an utterance from the mobile robot.

This mobile robot includes a personal identification unit which detects an existence of the tag based on the signal transmitted from the tag and obtains the identification information; a position information acquisition unit which obtains distance information indicating a distance from the mobile robot to the detection target provided with the tag; a locomotion speed detection unit which detects a locomotion speed of the mobile robot; a personal information acquisition unit which acquires personal information based on the identification information; a communication motion determination unit which determines contents of a communication motion based on the personal information; and an operation determination unit which adjusts a start timing of each content of the communication motion based on distance information and on the locomotion speed of the mobile robot.

According to the mobile robot, the personal identification unit of the mobile robot detects the presence of the tag by receiving the radio wave transmitted from the tag, when the detection target (person) provided with the tag (RFID tag) approaches the surroundings of the mobile robot. That is, the presence of the person in the vicinity of the robot is recognized.

When the presence of the detection target is detected, the personal identification unit obtains identification information stored on the tag, and the personal information acquisition unit acquires personal information of the detection target (person) based on identification information.

In this case, since the personal identification is performed based on identification information stored on the tag, the acquisition of personal information of the identified person can be obtained quickly than when the personal identification is performed based on the face recognition using image processing means.

Furthermore, if the personal information to be required for a normal communication, such as a name, a language, and a managerial position etc., is stored on the tag in identification information in addition to identification information, the personal identification can be achieved rapidly.

When personal information is stored in an external management system which is separately provided from the robot, the personal information acquisition unit requests the external management system to allow the access to personal information associated with identification information by a communication unit. Thereby, the personal information which is allowed to access is downloaded.

Then, the contents of the communication, e.g. the detail of the motion using a gesture and a hand gesture etc. or the detail of the utterance, are prepared based on personal information, e.g. a name, a language, and a managerial position etc., obtained by spending about 0.5 seconds Here, there is an appropriate start timing of the communication, without causing a discomfort against the detection target who is a communication partner.

Here, when the robot passes by the person during the locomotion of the robot and the robot starts a communication with a person, an enough time is required for starting the communication motion by the robot. In this case, for example, it is preferable that the enough time is determined so that the communication motion is started several seconds before the prediction time or is started several meters before the detection target D.

In this invention, therefore, distance information which indicates a distance from the mobile robot to the detection target is obtained by the position information acquisition unit, and a locomotion speed of the mobile robot is measured by the locomotion speed detection unit. Then, the time of when the mobile robot passes by the detection target, i.e. prediction time, is predicted based on distance information (relative distance) and the locomotion speed. Finally, the start timing of the communication motion is adjusted in consideration of the time lag between the instruction of the communication motion and an actual start time of the communication motion, in order to start the communication motion at an appropriate timing.

In this mobile robot, it is preferable that personal information includes language information which indicates the language of the detection target having the tag, and the communication motion determination unit determines the contents of the communication motion based on language information.

According to this mobile robot, since the language of the communication partner (person) can be obtained as personal information, the mobile robot can have a smooth communication with the person using the language which is recognizable by the person.

Additionally, it is preferable that the mobile robot includes a voice data input unit which inputs voice data; and a voice recognition unit which recognizes plural languages. In this case, it is preferable that the voice recognition unit specifies a language based on vocabularies recognized from the inputted voice data, and the communication motion determination unit determines the contents of the communication motion based on the specified language.

According to this mobile robot, since the voice recognition unit complies with plurality of different languages, the language of the communication partner can be specified from the utterance of the communication partner, even if the language of the communication partner cannot be convinced beforehand. Thereby, the communication with the communication partner can be continued by changing the language to the language which is recognizable by the communication partner.

In this mobile robot, it is preferable that the position information acquisition unit further obtains direction information indicating a direction with respect to the mobile robot of the detection target, and the communication motion is started after directing sights of the mobile robot toward the direction acquired by the position information acquisition unit.

According to this mobile robot, the communication motion is started after acquiring direction information which indicates a direction with respect to the mobile robot of the detection target and directing sights of the mobile robot toward the direction acquired by the position information acquisition unit. Thereby, the mobile robot can have a friendly communication with the communication partner without causing a discomfort on the communication partner.

According to the mobile robot of the present invention, the benefits as follows can be obtained. That is: the mobile robot acquires personal information of the communication partner and starts the communication with the communication partner at the timing determined in consideration of the locomotion speed of the mobile robot.

Also, the robot can provide the communication associated with personal information stored on the tag of the detection target, and can provide a friendly impression to the communication partners.

DETAILED DESCRIPTION OF THE PREFERRED EMBODIMENT

Hereinafter, a mobile robot according to the present invention will be explained with reference to attached drawings. In the following explanation, the mobile robot will be simply indicated as "robot".

The robot has various kinds of means for detecting a tag provided on a person who is a detection target, and the robot configures a target object detection system together with a tag.

Firstly the overall configuration of a target object detection system A will be explained with reference to FIG. 1. Here, the detail of the target object detection system is for example disclosed in Japanese unexamined patent publication No. 2005-288573(US 2005-0218292A).

(Configuration of Target Object Detection System A)

Figure 1:
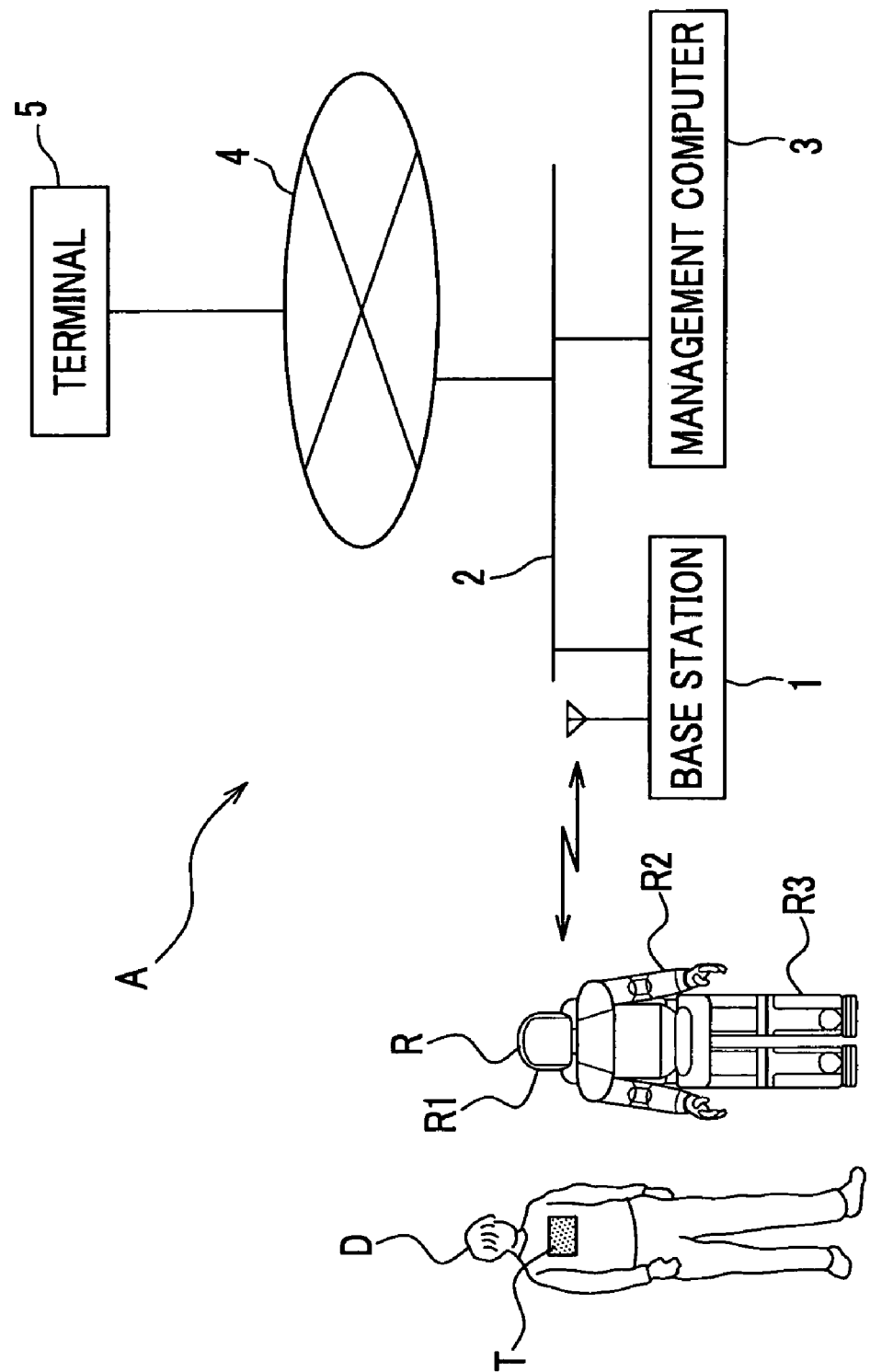
FIG. 1 is a block diagram of a target object detection system A according to the present embodiment.

FIG. 1 is a block diagram of a target object detection system A according to the present embodiment.

In the target object detection system A, a robot R checks whether or not a target object D, i.e. a person with a tag T, exists within a surrounding area of the robot R. The robot R measures a direction and distance of the target object D with respect to the robot R and determines the position of the target object D. That is, at least the following points are checked by the robot R: (1) how far the target object D is apart from the robot R; (2) which direction the target object D exists in.

As shown in FIG. 1, the targets object Detection system A includes a robot R, a base station 1, a management computer 3, a terminal 5, and a tag T. In this system A, the robot R communicates with the base station 1 by wireless communication. The base station 1 connects with the management computer 3 through a robot network 2. The management computer 3 connects with the terminal 5 through a network 4. The tag T is attached to the target object D. In this embodiment, a person with the tag T is defined as the target object D.

In the target object detection system A, the robot R detects a presence of the target object D, e.g. a person with the tag T, and measures the position of the detected target object D. The robot R further performs a personal identification with respect to the detected target object D if needed. That is, who is the detected target object D is detected by the robot R.

The management computer 3 performs the control of the base station 1 and controls the motion, e.g. a travel and an utterance, of the robot R through the robot network 2. The management computer 3 exchanges essential information (data) with the robot R.

In this embodiment, for example, a name of a person (target object D) and a map (map information) of the area where the robot R moves around correspond to the essential information. The essential information is stored in a recording means (not shown) provided in the management computer 3.

The robot network 2 connects the base station 1, the management computer 3, and the network 4 one another, and can be represented by LAN.

The terminal 5 connects with the management computer 3 through the network 4 and is used for the input and update of information, e.g. information relating to the tag T and information relating to a person (target object D) having a tag T, on the recording means (not shown) in the management computer 3. Here, for example, a RFID tag corresponds to the tag T.

Next, the construction of the robot R and the target object D will be explained in detail.

[Robot R]

The robot R which corresponds to a detector of the target object detection system A of this embodiment is an autonomous mobile robot which can perform a bipedal walking.

The robot R transmits radio wave to a surrounding area of the robot R, and irradiates a light signal to search regions which are established around the robot R. When a signal (receipt signal) from the target object D (tag T) is received, the robot R recognizes the existence of the target object D and uses the tag ID included in the receipt signal as information to identify the target object D (identification information). Here, receipt signal is a signal which notifies the robot R that the radio wave and light signal transmitted (irradiated) from the robot R has been received by the target object D (tag T).

Then, the robot R computes the distance to the target object D (tag T) from the robot R, based on the field strength of the receipt signal. Additionally, the robot R regards the irradiation direction of the light signal received by the target object D, as the direction of the target object D. Thereby, the robot R, based on the receipt signal, can detect the target object D and measure the position of the target object D.

Furthermore, the robot R acquires personal information of the target object D based on the identification information, and prepares the contents for a communication with the target object D. Also, the robot R measures the traveling speed of the robot R and the distance from the robot R to the target object D, and determines the start time of the communication based on the obtained distance and traveling speed.

As shown in FIG. 1, the robot R includes a head R1, an arm R2, and a leg R3, which are respectively actuated by an actuator. Thereby, under the control of an autonomous travel controller 50 (see FIG. 2), the robot R performs various types of motions of: a bipedal walking; a conveyance of the object; and a communication using a gesture, a hand gesture, a hand language and etc. The detail of the bipedal walking, for example, is disclosed in Japanese unexamined patent application JP2001-62760.

Figure 2:
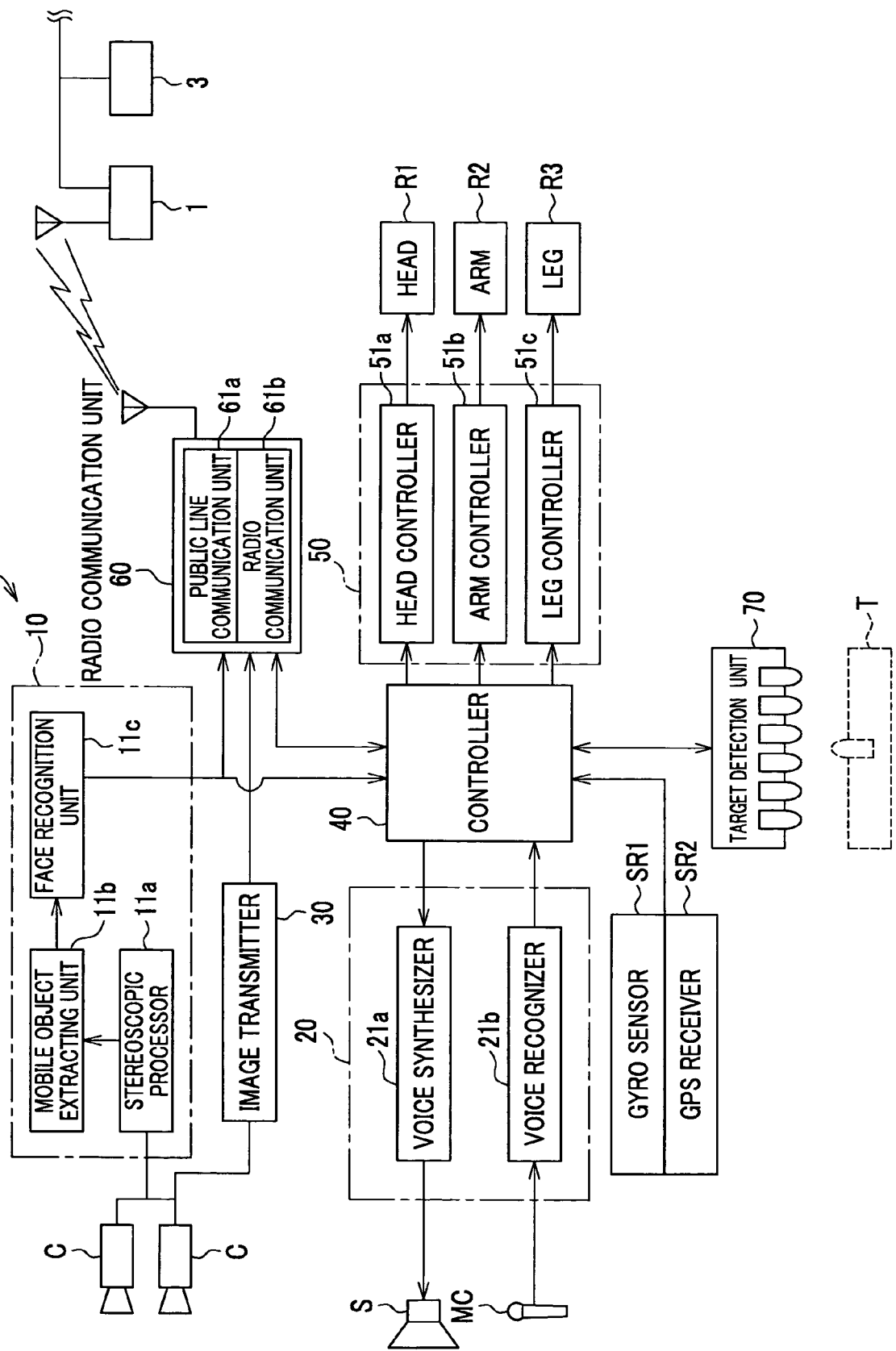
FIG. 2 is a block diagram of a robot R.

FIG. 2 is a block diagram of a robot R.

As shown in FIG. 2, the robot R includes cameras C, a speaker S, a microphone MC, an image processor 10, a voice processor 20, an image transmitter 30, a controller 40, the autonomous travel controller 50, a radio communication unit 60, and a target detection unit 70 in addition to the head R1, the arm R2, and the leg R3. The robot R further includes a gyro sensor SR1 and a GPS receiver SR2 for measuring the position of the robot R.

[Camera C]

The camera C acquires images in a form of digital format. In this embodiment, for example, a color CCD (Charge-Coupled Device) camera is adopted as the camera C. Cameras C, C are arranged in a line along a lateral direction. The image acquired by the cameras C is respectively supplied to the image processor 10 and the image transmitter 30. In this embodiment, the cameras C, the speaker S, and the microphone MC are installed within the head R1 of the robot R.

[Image Processor 10]

The image processor 10 performs recognition of a person and an obstacle in the surrounding area, in order to recognize the condition of the surrounding area of the robot R based on the image acquired by the cameras C. This image processor 10 includes a stereoscopic processor 11a, a mobile object extracting unit 11b, and a face recognition unit 11c.

The stereoscopic processor 11a performs a pattern matching between images obtained from each camera C on the basis of one of two images acquired by the cameras C. In this embodiment, since the robot R has two cameras (a left-side camera and a right-side camera), one of two images is the image obtained from left-side camera and the other of two images is the image obtained from right-side camera. Thus, the pattern patching is performed between the image obtained from left-side camera and the image obtained from right-side camera.

Then the stereoscopic processor 11a computes a parallax between two images to generate a parallax image, and outputs a parallax image to the mobile object extracting unit 11b together with the image entered from the cameras C and C. Here, the computing of the parallax is performed between corresponding pixels in two images. In the parallax image, the distance from the robot R (camera C) to the target object is indicated by the difference of the brightness.

Also, the stereoscopic processor 11a computes a direction of the target object D and a distance from the robot R to the target object D, based on the computing result of the parallax and the direction of the image pickup. Furthermore, the stereoscopic processor 11a can compute a face direction of the target object D and a distance to the face position of the target object D, by further using the recognition result of position of the face obtained by the face recognition unit 11c.

The mobile object extracting unit 11b extracts a mobile (moving) object from the image obtained by the camera C, based on data entered from the stereoscopic processor 11a. The reason why the extraction of the mobile object is performed is to perform the recognition of a person on the assumption that it is more likely that the moving object is a person.

The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the last frame (image) which is generated from several frames obtained prior to the acquisition of the current frame.

Then, the mobile object extracting unit 11b, based on the distance image and the parallax image, searches the pixels whose shift amount is large, from among the pixels within a predetermined distance from the cameras C (robot R). If such pixel exists, the mobile object extracting unit 11b considers that a person is within the pixels (distance), and extracts a mobile object from the image entered from the camera based on the distance image and the parallax image.

The face recognition unit 11c extracts a human body color region from the extracted mobile object, and computes position of the face of a human in consideration of a size and shape of the extracted human body color region. Here, the position of a hand is also computed by the same method.

The position of the recognized face is supplied to the controller 40 for communicating with a person and for actuating the robot R. Additionally, the position of the recognized face is supplied to the radio communication unit 60 in order to supply to the management computer 3 through the base station 1.

[Voice Processor]

The voice processor 20 includes a voice synthesizer 21a and a voice recognizer 21b which are used when the robot R has a communication with a person.

The voice synthesizer 21a generates voice data from text information, based on a command, which commands the robot R to have a conversation with a human or to sound a voice message and which is entered from the controller 40. Then, the voice synthesizer 21a outputs voice data to the speaker S. Here, the generation of voice data is, for example, performed by utilizing the correspondence between voice data and text information stored beforehand in a recording unit (not shown).

Here, the voice synthesizer 21a can handle different languages, and can synthesize voice data in different languages, e.g. English and Japanese.

The voice recognizer 21b input with voice data from microphone MC, and generates text information from voice data, based on the correspondence between voice data and text information stored beforehand in the recording unit (not shown). Then, the voice recognizer 21b outputs text information to the controller 40.

Here, the voice recognizer 21b can handle different languages, and for example can recognize the meanings of English and Japanese, when voice data is entered.

Therefore, the voice recognizer 21b analyzes input voice data and can find out which language between Japanese and English is spoken by a speaker based on vocabulary obtained as a result of the analysis.

As example of this kind of language identification, a morphological analysis can be used in this embodiment. In this morphological analysis, input voice data is converted into text data in which voice data is divided into phoneme of language. Then, by performing the morphological analysis on text data, voice data is divided into vocabulary (word).

Here, the term of "morphologic" denotes a minimum character string whose meaning will be lost if a sentence is punctuated with further short character string. The morphologic analysis is a technique to analyze a sentence by dividing a sentence into morphemes that are primitives of a sentence.

In the case of Japanese language morphologic analysis, for example, the Japanese sentence "kyounotennkihaharedesu" (English meaning: today is fine day) can be divided as "kyou no tennki ha hare desu".

Then, the voice recognizer 21b finds out the language spoken by a speaker by evaluating the availability of the divided word.

Here, the voice recognizer 21b may recognize not only two languages of Japanese and English but also another language such as Chinese and Korean etc. Additionally, the voice recognizer 21b may be configured to recognize two or three languages which are selected from among a plurality of languages. In this case, it is preferable that the languages to be selected simultaneously are limited to a small number so that the processing load on the voice recognizer 21b is reduced.

Additionally, it is preferable that the voice recognizer 21b performs the analysis based on the language spoken by the speaker, when the language is known beforehand. Here, if the voice recognizer 21b fails the analysis, the voice recognizer 21b considers that the selection of the language is not proper. Then, the voice recognizer 21b continues the analysis by changing the language one by one.

Here, it is preferable that voice data is temporarily stored on a recording unit, e.g. memory etc. In this case, since voice data stored on the recording unit can be used when the analysis of voice data is failed and the retry of the analysis is required, the request of the repeat of an utterance to the speaker can be avoided.

Additionally, the voice synthesizer 21a can synthesize voice data of the languages which are recognizable in the voice recognizer 21b.

[Image Transmitter]

The image transmitter 30 outputs image data entered from the cameras C to the management computer 3 through the radio communication unit 60.

[Controller 40]

Figure 3:
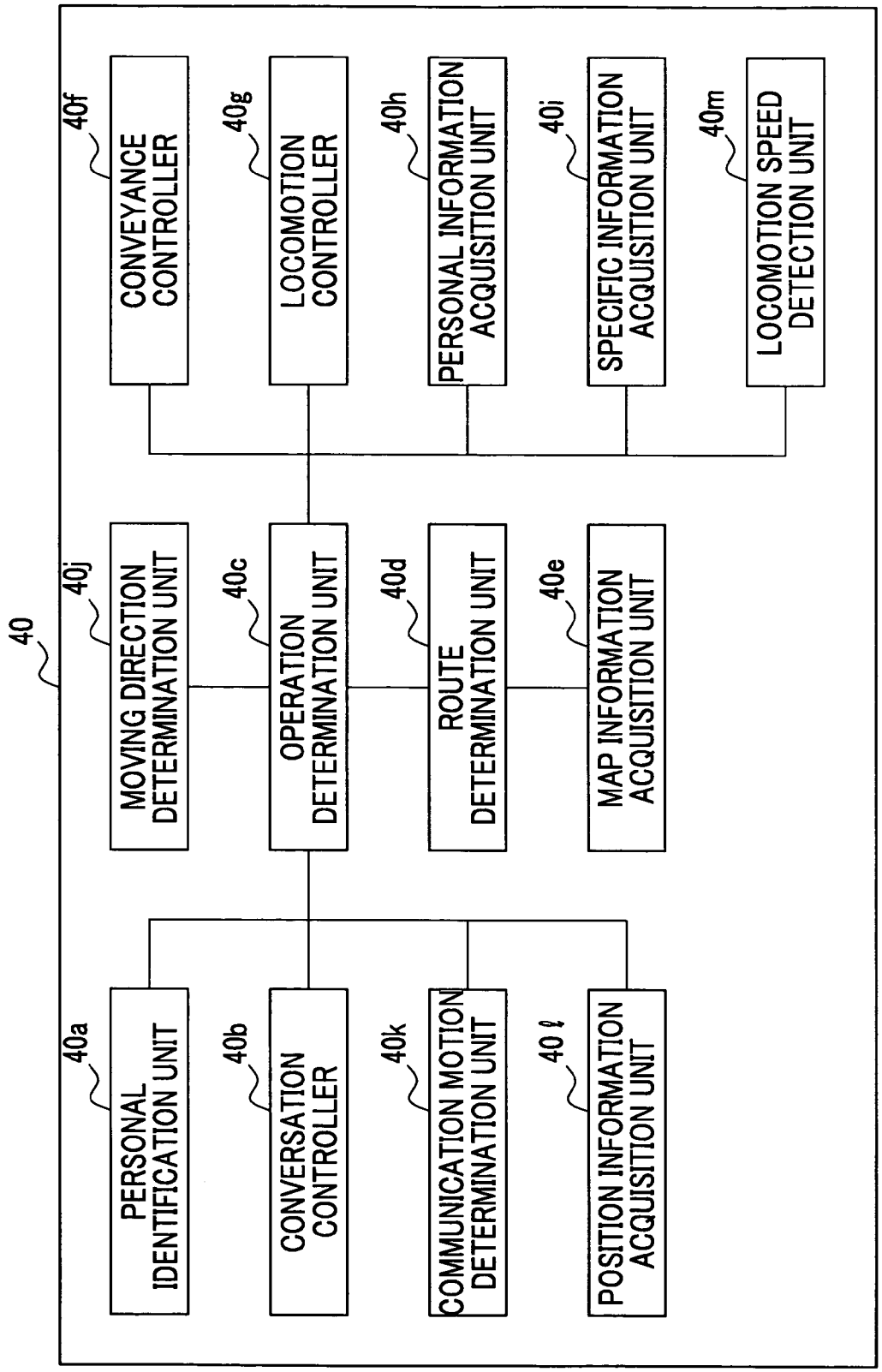
FIG. 3 is a block diagram of a controller 40 controlling the robot R.

FIG. 3 is a block diagram of the controller 40 which controls a robot R.

The controller 40 controls the robot R as a whole, and includes a personal identification unit 40a, a conversation controller 40b, an operation determination unit 40c, a route determination unit 40d, a map information acquisition unit 40e, a conveyance controller 40f, a locomotion controller 40g, a personal information acquisition unit 40h, a specific information acquisition unit 40i, a moving direction determination unit 40j, a communication motion determination unit 40k, a position information acquisition unit 40l, and a locomotion speed detection unit 40m.

(Personal Identification Unit)

The personal identification unit 40a performs a personal identification based on the tag ID transmitted from the detection tag T. In other words, the personal identification unit 40a identifies who is the person having the tag T. The personal identification unit 40a acquires personal information associated with an unique identification number (tag ID) from a personal information database 3g (see FIG. 7) of the management computer 3 (see FIG. 1), and then identifies a person based on personal information. Thereby, the robot R can have a conversation with a person based on personal information. Here, personal information obtained by the personal identification unit 40a is for example the tag ID assigned to the tag T, an age of the person, a sex of the person, a language of the person, a managerial position of the person, a hobby of the person, a schedule of the person, and etc.

Additionally, the personal identification unit 40a can identify the person by comparing the face image, which is recognized by the face recognition unit 11c of the image processor 10, of the person with the face image, which is stored beforehand in a recording unit (not shown).

Then, the personal identification unit 40a obtains personal information associated with the identified person from a database based on the identified face image in similar ways as when personal information is acquired using the tag ID.

Here, it is preferable that personal information is stored on the personal information database 3g (see FIG. 7) of a recording unit stored in the management computer 3.

In this case, the personal identification unit 40a transmits the tag ID to the management computer 3 when the tag ID is acquired from the detection tag T. Thereby, in the management computer 3, the recording unit (not shown) is searched using the tag ID as a key to extract personal information associated with the tag ID is extracted. Then, the extracted personal information is transmitted to the robot R.

Thereby, in the robot R, the personal identification is performed by using the extracted personal information associated with the tag ID, when the extracted personal information is received.

Additionally, personal information may be recorded in a recording unit (not shown) installed within the robot T. In this case, the personal identification unit searches the recording unit (not shown) using the tag ID, which is transmitted from the tag T, and extracts personal information associated with the tag ID. Thereby, the personal identification unit 40a obtains personal information associated with the tag ID.

Furthermore, it is preferable that the personal identification unit 40a obtains face information of a person who is a detection target and that the personal identification unit 40a performs the personal identification by comparing the obtained face information with the face information registered beforehand.

Here, since an approval by a person is required to obtain face information of the person, it may be difficult to register face information of all people. In this embodiment, therefore, the personal identification can be achieved by using personal information when face information is not obtained. Also, if both of face information and personal information are obtained, the identification of the person with the tag T can be achieved with high accuracy by using both of information.

However, if it is required that the robot R greets a person when the robot R passes by the person, the robot R cannot provide a greeting motion at a suitable timing if the robot is configured to perform the personal identification using personal information after obtaining the face image of the person.

In this case, therefore, it is preferable that the personal identification is performed using the personal information which is obtained based on the tag ID.

Instead, the personal identification may be performed using the personal information which is obtained based on tag ID, if the personal identification using face information by the personal identification unit 40a is not completed before the timing of the greeting motion. Additionally, the personal identification may be performed using at least one of face information and personal information which is obtained based on the tag ID, when the personal identification based on face information by the personal identification unit 40a is completed before the timing of the greeting motion.

(Conversation Controller)

The conversation controller 40b generates a text to be uttered in the language recognized by the voice recognizer 21b or the language determined by personal information. Then, the conversation controller 40b outputs the text to the voice processor 20 to output a synthesized voice by the voice synthesizer 21a.

Also, the conversation controller 40b receives a text, which is obtained by the recognition in the voice recognizer 21b, from the voice processor 20, and recognizes the meaning of the text. Then, the conversation controller 40b generates a text for reply or determines the motions of the robot R.

Here, it is preferable that patterns of utterance (utterance pattern) are stored beforehand in an utterance information database 3h in a recording unit stored in the management computer 3, and that a suitable utterance pattern is downloaded as appropriate when generating a text to be uttered.

(Operation Determination Unit)

The operation determination unit 40c determines motions etc. which are performed by the robot R, and outputs a command to each section of the robot R to provide determined motions. In this embodiment, for example, the operation determination unit 40c outputs a command, by which the robot R moves to a destination (identified position), to the autonomous travel controller 50, when the tag T is detected and the position (distance and direction with respect to the robot R of the tag T) is identified. Additionally, the operation determination unit 40c controls the start timing of the communication motion determined by the communication motion determination unit 40k.

Additionally, the operation determination unit 40c manages the contents of each command supplied to each section, and recognizes an operation state of each section. Here, whether or not the robot R is in traveling and whether or not the robot R holds an object with both hands are example of the operation state.

(Route Determination Unit)

The route determination unit 40*d* determines, as destination, the position specified based on the direction and distance which are detected by the target detection unit 70. Next, the route determination unit 40*d* indicates the destination on a map generated from map information which is acquired by the map information acquisition unit 40*e*. Then, the route determination unit 40*d* determines the route from the current position of the robot R to the destination.

(Map Information Acquisition Unit)

The map information acquisition unit 40*e* acquires map information in consideration of the destination and current position of the robot R. That is, map information is acquired in consideration of the direction and distance detected by the target detection unit 70. Preferably, map information is stored on a map information database 3*d* (see FIG. 7) on a recording unit stored in the management computer 3.

(Conveyance Controller)

The conveyance controller 40*f* controls the conveyance operation which is determined by the operation determination unit 40*c*. Here, for example, the conveyance operation becomes as a standard, when the object is transferred to a certain place in compliance with the conversation with the person.

The locomotion controller 40*g* travels the robot R to the destination by actuating the leg R3. Here, the locomotion controller 40*g* outputs a command to the autonomous travel controller 50 and controls the position of the center of gravity by actuating the head R1 and the arm R2 in addition to the leg R3. Here, the head R1, the arm R2, and the leg R3 are actuated under the control of a head controller 51*a*, an arm controller 51*b*, and a leg controller 51*c*, respectively.

(Personal Information Acquisition Unit)

The personal information acquisition unit 40*h* acquires personal information. The personal information acquisition unit 40*h* transmits tag ID to the management computer 3 when the map information acquisition unit 40*e* obtains the tag ID from the tag T. Then, personal information acquisition unit 40*h* receives personal information, which is acquired from the personal information database 3*g* (see FIG. 7) of the management computer 3 by searching and extracting personal information including the tag ID from the personal information database 3*g*. Thereby, personal information associated with the tag ID is obtained.

(Specific Information Acquisition Unit)

The specific information acquisition unit 40*i* acquires specific information which is information to be used to determine the operation (motion) of the robot R. In this embodiment, also, specific information is information which is required when personal information is obtained. Here, information to be required for providing an operation under a schedule is specific information, when the schedule of a person is included as the contents of personal information. For example, weather information (weather prediction) around a certain golf course is example of the specific information, when the content of the schedule is golf and a certain golf course in Tochigi is determined as a venue.

(Direction Specification Unit)

The moving direction determination unit 40*j* computes a direction and distance of movement (moving direction and distance) of the tag T and specifies the direction of the movement. Here, the computing of the moving direction and distance is performed based on the relation between the moving direction and distance, which are detected by the target detection unit 70 at certain time, and the moving direction and distance, which are detected by the target detection unit 70 at different time.

For example, the moving direction determination unit 40*j* plots the positions at different times of the tag T on x-y coordinate space, in which a fore direction of the robot R is defined as "+x direction" and a right direction of the robot R is defined as "+y direction". Here, the position of the robot R is computed based on the direction and distance of the tag T detected by the tag detection unit 70. In this case, the moving direction determination unit 40*j* can compute the moving direction and distance of the tag T based on two locations on x-y coordinate space.

In this embodiment, since the direction and distance of the tag T are entered from the target detection system 70 in real time, the moving direction and distance of the tag T can be computed. Thereby, the moving direction determination unit 40*j* can move the robot R to the computed moving direction.

(Communication Motion Determination Unit)

The communication motion determination unit 40*k* determines whether or not to provide a communication motion or determines the detail of the communication motion, when the personal identification unit 40*a* detects the person who comes near to the surroundings of the robot R. This determination is performed when the task command is entered from the management computer 3 through the radio communication unit 60.

When determining the detail of the communication motion, the communication motion determination unit 40*k* refers to: personal information, which is acquired by the personal information acquisition unit 40*h* based on the tag ID of the tag T which is provided on the person detected by the personal identification unit 40*a*; positional information of the person detected by the image processor 10 or the target detection unit 70; and an operation state, which is managed and recognized by the operation determination unit 40*c*. Then, the communication motion determination unit 40*k* determines the communication motion in compliance with a rule of motions defined by the task command.

Here, a greeting motion pattern will be explained with reference to FIG. 1 as example of a communication motion.

Figure 18A:
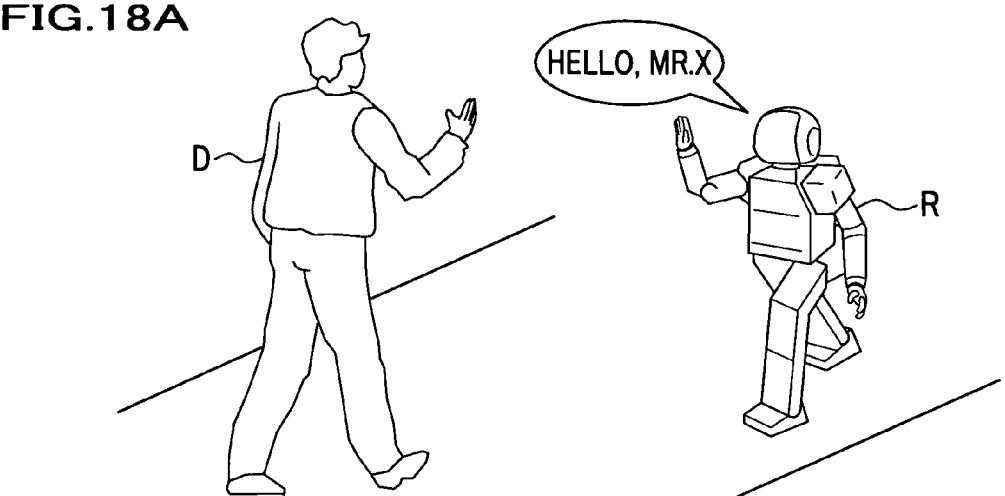
FIG. 18A is an explanatory view of the conversation motion pattern in which the robot makes a greeting in English with raising the right hand.

For example, when the language of a person is English, as shown in FIG. 18A, the robot utters "Hello, Mr. X" to the person who was detected by the robot R, with directing the face of the robot R to the person and raising right hand.

Figure 18B:
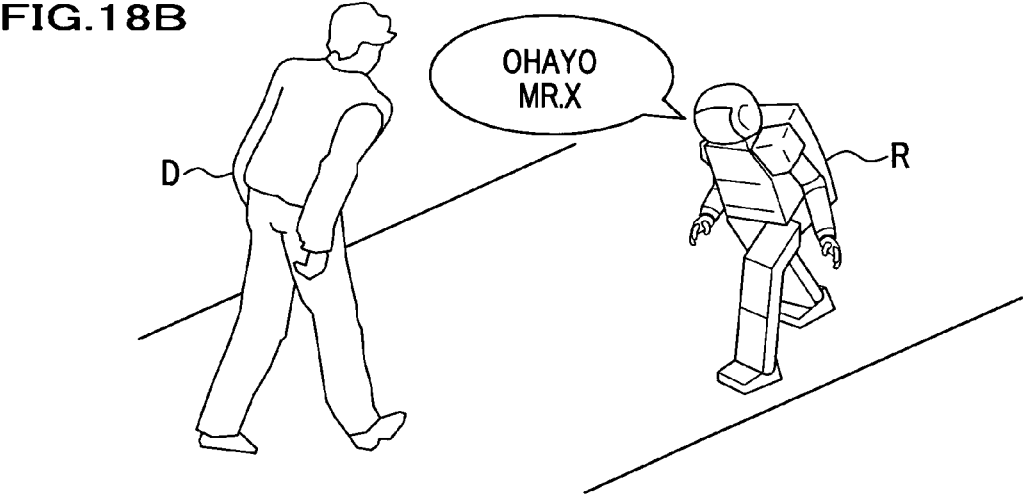
FIG. 18B is an explanatory view of the conversation motion pattern in which the robot makes a greeting in Japanese with a bowing.

When the language is Japanese, as shown in FIG. 18B, the robot R provides a Japanese cultural greeting. That is, the robot R utters "Ohayo Mr.X" with a nod.

Figure 18C:
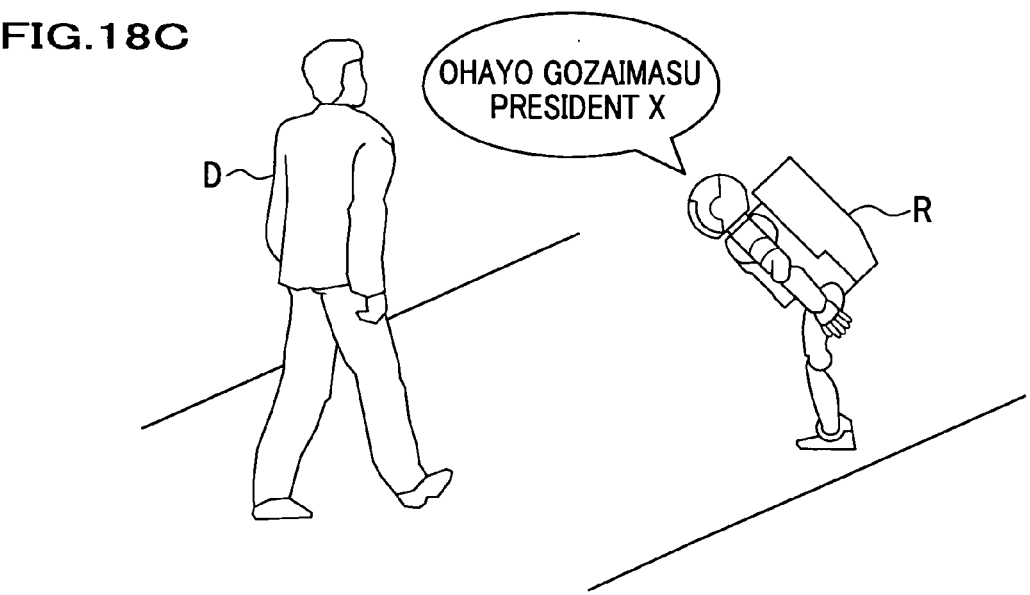
FIG. 18C is an explanatory view of the conversation motion pattern in which the robot stops a walking and makes a greeting with a deep bowing.

Furthermore, when the detected person is an executive or a valued visitor and language is Japanese, as shown in FIG. 18C, the robot R stops the locomotion and directs the body against the detected person. Then, the robot R performs a particular greeting motion, such as the utterance of "Ohayo Gozaimasu President X." with a deep bow.

In this case, the robot R modifies the greeting motion as appropriate according to the operation state of the robot R. For example, when the robot R is under the operation of the conveyance of the object and both hands of the robot R are used for holding the object, the robot R provides the greeting motion with a bow without raising the right hand.

Then, the greeting motion determined by the communication motion determination unit 40*k* is performed by the operation determination unit 40*c* while adjusting the relation with other operations managed by the operation determination unit 40*c*.

(Position Information Acquisition Unit)

The position information acquisition unit 40l acquires positional information of the detection target D. That is, the position information acquisition unit 40l acquires information indicating a direction of the detection target D and a distance from the robot R to the detection target D.

In this embodiment, there are two types of information as positional information. One of information is the information which indicates the distance from the robot R to the detection target D and also indicates the direction with regard to the robot R of the detection target D. Here, this information is computed based on the parallax and the direction of the image pickup when the image pickup of the detection target D is performed by cameras C under the control of the image processor 10. The other of information is the information which indicates the distance from the robot R to the detection target D and also indicates the direction with regard to the robot R of the detection target D. Here, the other information is obtained by the position computing part 81b of the unit controller 80.

(Locomotion Speed Detection Unit)

The locomotion speed detection unit 40m obtains information with regard to the operation state of the leg R3 from the autonomous travel controller 50 and detects the current locomotion speed (walking speed) of the robot R.

The leg controller 51c of the autonomous travel controller 50 drives and turns each of a hip joint, a knee joint, and an ankle joint using a drive motor. Also, the leg controller 51c measures the degree of rotation (a rotation angle and a rotating speed) using a rotary encoder provided to each joint.

In this embodiment, the locomotion speed detection unit 40m computes a walking speed of the robot R based on the degree of rotation of each joint and the length between joints (length of link) and controls the robot R so that the robot R walks at a predetermined walking speed (locomotion speed). Then, the locomotion speed detection unit 40m obtains information relating to the walking speed of the robot R from the leg controller 51c through the autonomous travel controller 50.

[Autonomous Travel Controller]

As shown in FIG. 2, the autonomous travel controller 50 includes the head controller 51a, the arm controller 51b, and the leg controller 51c.

The head controller 51a actuates the head R1 based on a command entered from the controller 40. The arm controller 51b actuates the arm R2 based on a command entered from the controller 40. The leg controller 51c actuates a leg p R3 based on a command entered from the controller 40.

Additionally, data obtained by the gyro sensor SR1 and the GPS receiver SR2 is supplied to the controller 40, and is used for deciding the motion of the robot R. Also, the same data is supplied to the management computer 3 through the radio communication unit 60.

[Radio Communication Unit]

The radio communication unit 60 exchanges data with the management computer 3. The radio communication unit 60 includes a public line communication unit 61a and a radio communication unit 61b.

The public line communication unit 61a performs a wireless communication by using a cellular phone line or a personal handyphone system. The radio communication unit 61b performs a wireless communication by using a short-range wireless communication technique, e.g. a wireless local area network complying with IEEE802.11b standard.

The radio communication unit 60 performs a data exchange with the management computer 3 using one of the public line communication unit 61a and the radio communication unit 61b, when a signal which commands the robot R to communicate with the management computer 3 is entered from the management computer 3.

[Target Detection Unit]

The target detection unit 70 detects a presence of the target object D with the tag T within a surrounding area of the robot R, and computes the position of the target object D when the target object D exists in the surrounding area.

Here, the acquisition of data is disturbed due to the occurrence of the collision of radio waves, when a plurality of tags exists in a detectable area and each tag Transmits radio wave simultaneously. In this embodiment, therefore, a transmission slot (time slot) is selected randomly when transmitting radio wave so that the occurrence of the collision of the radio wave is reduced even if a plurality of tags exists in a detectable area.

Figure 4:
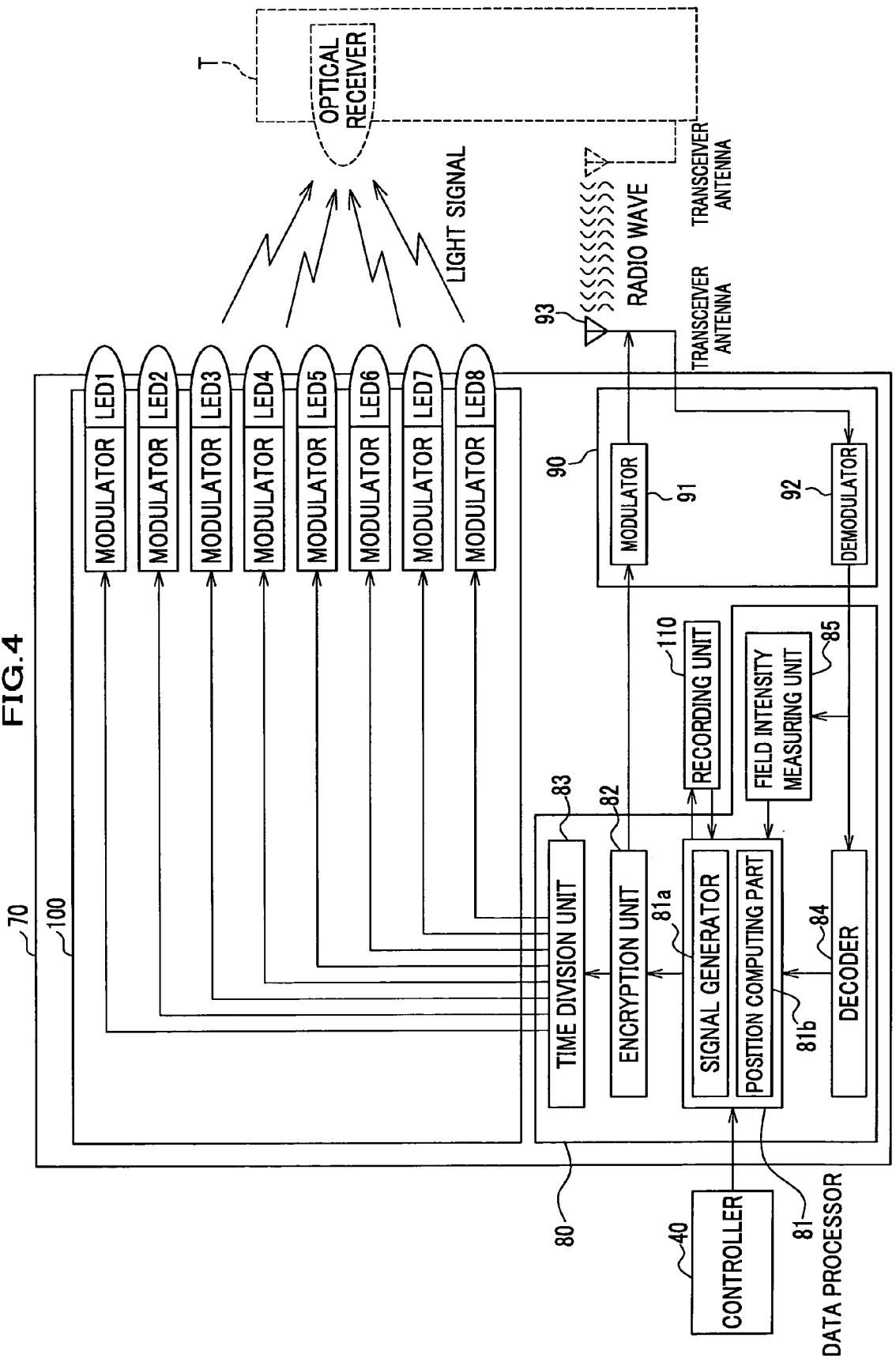
FIG. 4 is a block diagram of a target object detection unit 70 of a robot R.

As shown in FIG. 4, the target detection unit 70 includes a unit controller 80, a radio transmitter-receiver 90, a light emission unit 100, and a recording unit 110.

(Unit Controller 80)

The unit controller 80 generates a search signal to be transmitted from the radio transmitter-receiver 90, and a direction check signal which is emitted as an infrared light from the light emission unit 100.

The unit controller 80, additionally, determines the position of the target object D based on a receipt signal, which is transmitted from the tag T when the tag T receives the search signal.

Here, the search signal is a signal to be used for checking whether or not the target object D exists in the surrounding area of the robot R, and the direction check signal is a signal to be used for checking which direction with respect to the robot R the target object D exists in. The receipt signal is a signal which indicates that the tag T has received at least the search signal.

The unit controller 80 includes a data processor 81, an encryption unit 82, a time division unit 83, a decoder 84, and a field intensity measuring unit 85.

The data processor 81 generates the search signal and the direction check signal, and determines the position of the target object D. The data processor 81 includes a signal generator 81a and a position computing part 81b.

(Signal Generator)

The signal generator 81a obtains a robot ID from the recording unit 110 at a predetermined cycle or when a signal (a transmission request signal), which requests the transmission of radio wave, is entered from the controller 40. Here, the robot ID is a unique identification number of the robot R, in which the target detection unit 70 is installed.

Then, the signal generator 81a generates a search signal which includes the robot ID and receipt request signal. Here, the receipt request signal is a signal which commands the target object D (tag T) to generate the receipt signal when the target object D (tag T) receives the search signal.

When generating search signal, the signal generator 81a generates the direction check signal, which is emitted as an infrared light signal from the light emission unit 100. The direction check signal is generated for each light emitter (LED 1 to LED 8) of the light emission unit 100, separately, and includes the robot ID and an emitter ID, which is a unique identification number for identifying the light emitter. In this embodiment, this direction check signal is also generated, when the receipt signal entered from the decoder 84 includes an emission request signal.

In the present embodiment, since a total of eight light emitters are provided on the robot R, the data processor 81 generates a total of eight direction check signal, which includes a robot ID and the emitter ID.

Then, the signal generator 81a outputs the direction check signal and the search signal to the encryption unit 82. P Here, the position computing part 81b of data processor 81 measures the position of the target object D based on the receipt signal transmitted from the tag T which has received the search signal. The detailed explanation of the signal processing in the position computing part 81b will be made later together with the signal processing in the field intensity measuring unit 85 and the decoder 84.

(Encryption Unit)

The encryption unit 82 encrypts the search signal entered from the data processor 81, and outputs the encrypted search signal to the radio transmitter-receiver 90. Thereby, the encrypted search signal is modulated and is transmitted from the radio transmitter-receiver 90.

On the other hand, the encryption unit 82 encrypts the direction check signal entered from the data processor 81 to obtain the encrypted direction check signal, and outputs the encrypted direction check signal to the time division unit 83.

In this embodiment, the direction check signal is generated to each light emitter of the light emission unit 100.

As shown in FIG. 4, since the light emission unit 100 has a total of eight light emitters, a total of eight direction check signals are generated in the encryption unit 82 and are entered to the time division unit 83.

(Time Division Unit)

The time division unit 83 determines the order of the emission of light emitters (LED1-LED8) of the light emission unit 100, and the timing of the emission of each light emitter (LED 1-LED 8).

To be more specific, the time division unit 83 determines the order and timing of the emission of each light emitter (LED 1-LED 8) when the encrypted direction check signal is entered from the encryption unit 82. Then, the time division unit 83 outputs the encrypted direction check signal to the light emission unit 100 based on the order and timing which were determined.

In this embodiment, a total of eight encrypted direction check signals are entered to the time division unit 83, and the light emitter to which each encrypted direction check signal is supplied is determined beforehand in the data processor 81.

The time division unit 83, therefore, checks the emitter ID included in the encrypted direction check signal when the encrypted direction check signal is entered, and outputs the encrypted direction check signal to the modulator of the light emitter, which is specified by the emitter ID, at the determined order and timing.

(Light Emission Unit)

The light emission unit 100 emits a light to search regions, which are established around the robot R based on the position of the robot R.

Figure 5:
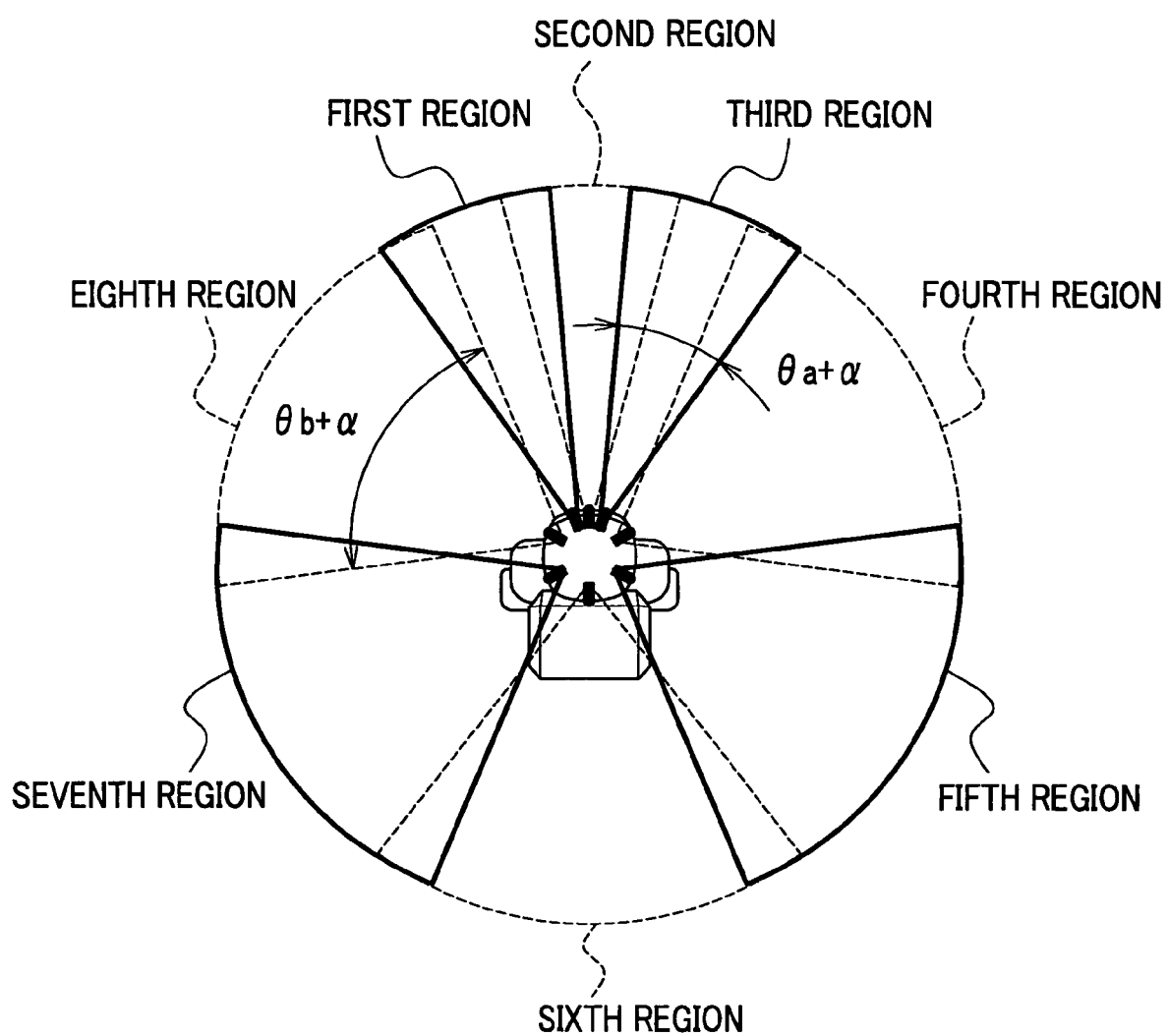
FIG. 5 is an explanatory view of search regions established around the robot R.

Referring to FIGS. 4 and 5, the light emission unit 100 includes a plurality of light emitters (LED1-LED8) and modulators provided to each light emitter.

The modulator modulates the encrypted direction check signal entered from the time division unit 83 to obtain a modulated signal. The light emitter emits the modulated signal as an infrared light signal (infrared light) to the predetermined search region.

In this embodiment, the surrounding area of the robot R is divided into a plurality of search regions in order to determine the position (direction) of the target object D (see FIG. 5). The robot R is provided with light emitting diodes, each is served as the light emitter for emitting infrared light to the search region and each is directed to the specific search region. Here, one light emitting diode is directed to one search region.

To be more precise, in the case of FIG. 4A, a total of eight search regions (from first region to eighth region) are established around the robot R. That is, the robot R is provided with a total of eight search regions in 360-degree directions of the robot R.

In other words, the fan-shaped search regions (from first region to eighth region) are established around the robot R so that the robot R is surrounded by fan-shaped search regions. The robot R is positioned at the center of the region formed by these fan-shaped search regions (from first region to eighth region).

Therefore, in the case of FIG. 5, a total of eight light emitters are provided around the head part R1 of the robot R so that the infrared light is surely emitted toward each search region.

As can be seen from FIG. 5, the search regions (from first region to third region) which are provided in front of the robot R are narrower than the remainders of search regions (from fourth region to eighth region). In this embodiment, as for search regions (from first region to third region), the angular range of an infrared light emitted from the light emitting diode is established at ..a, and as for search regions (from fourth region to eighth region), the angular range of an infrared light emitted from the light emitting diode is established at ..b.

Here, when the robot R detects the presence of the target object D and directs the face of the robot R to the detected target object D, if the direction of the face of the robot R does not agree with the direction of the target object, the target object D (person) may feel that the robot R is not directing his face toward the target object D.

For preventing the occurrence of such situation, it is preferable to increase the number of search regions, but is not necessarily to increase the number of the search regions along 360-degree direction. The occurrence of such situation can be prevented by only increasing the numbers of the search regions which are positioning in front of the robot R. By adopting this manner, the position detection in the front-side of the robot R can be achieved with accuracy and the numbers of the light emitter can be curbed.

Therefore, in this embodiment, the position detection with sufficient accuracy of the target object D within each search region (from first region to the third region) is enabled, by narrowing the irradiation range of an infrared light with respect to respective search regions which are located in front of the robot R.

Thus, the position detection of the person can be achieved with accuracy, if the target object D is a person and an image pickup of a face image of the person is performed by cameras C, C of the robot R. In this case, the cameras C, C of the robot R can be directed to the face of the person as the target object D. Since the result of the position detection can reflect on the motion control of the robot R and the adjustment of an angle of cameras C, C, the cameras C, C of the robot R can be directed to the face of the person as the target object D.

In this embodiment, additionally, in order to minimize the region excluded from the search region, i.e. to minimize a dead space in the surrounding area, the range of the search region is determined so that adjoining search regions overlap each other at edge.

(Radio Transmitter-Receiver)

The radio transmitter-receiver 90 transmits radio wave toward a surrounding area of the robot R, and receives a receipt signal transmitted from the target object D which has received the radio wave.

The radio transmitter-receiver 90 includes a modulator 91, a demodulator 92, and a transceiver antenna 93.

The modulator 91 modulates the encrypted search signal, which is entered from the data processor 81, to generate a modulated signal, and transmits the modulated signal through the transceiver antenna 93.

The demodulator 92 receives the modulated signal transmitted via wireless from the tag T of the target object D, and obtains the encrypted receipt signal by demodulating the modulated signal. Then, the demodulator 92 outputs the encrypted receipt signal to the decoder 84 and the field intensity measuring unit 85 of the unit controller 80.

(Decoder)

The decoder 84 obtains the receipt signal by decoding the encrypted receipt signal, which was generated by coding the receipt signal, and outputs the receipt signal to the data processor 81.

In this embodiment, since the receipt signal includes at least the emitter ID, the robot ID, and a tag ID, the decoder 84 outputs these IDs to the data processor 81. Additionally, if the receipt signal includes the emission request signal, the decoder 84 also outputs the emission request signal to the data processor 81.

(Field Intensity Measuring Unit)

The field intensity measuring unit 85 measures an intensity of the modulated signal, when the modulated signal transmitted from the tag T of the target object D is received by the radio transmitter-receiver 90.

To be more precise, the field intensity measuring unit 85 detects a power of the encrypted receipt signal, which is entered from the demodulator 92 of the radio transmitter-receiver 90, and computes an average of the detected power. Then, the field intensity measuring unit 85 outputs the computed average value to the data processor 81 as the data of the field intensity.

[Position Computing Part]

The position computing part 81*b* of the data processor 81 determines the position of the target object D.

To be more specific, the position computing part 81*b* computes the distance from the robot R to the target object D based on the field intensity of the modulated signal, which is received in the radio transmitter-receiver 90 and is transmitted from the tag T of the target object D.

The position computing part 81*b*, additionally, refers to the emitter ID included in the receipt signal, and identifies the light emitter which has emitted an infrared light received by the target object D based on the emitter ID. Then, the position computing part 81*b* regards the direction of the search region to which the light emitter identified by the emitter ID has irradiated an infrared light, as the direction of the target object. Thereby, the position (direction) of the target object can be identified.

In this embodiment, the position computing part 81*b* firstly obtains the robot ID from the receipt signal entered from the decoder 84. Then, the position computing part 81*b* compares the obtained robot ID with the robot ID stored on the recording unit 110. If both robot IDs are the same, the position computing part 81*b* starts the position detection.

Figure 6:
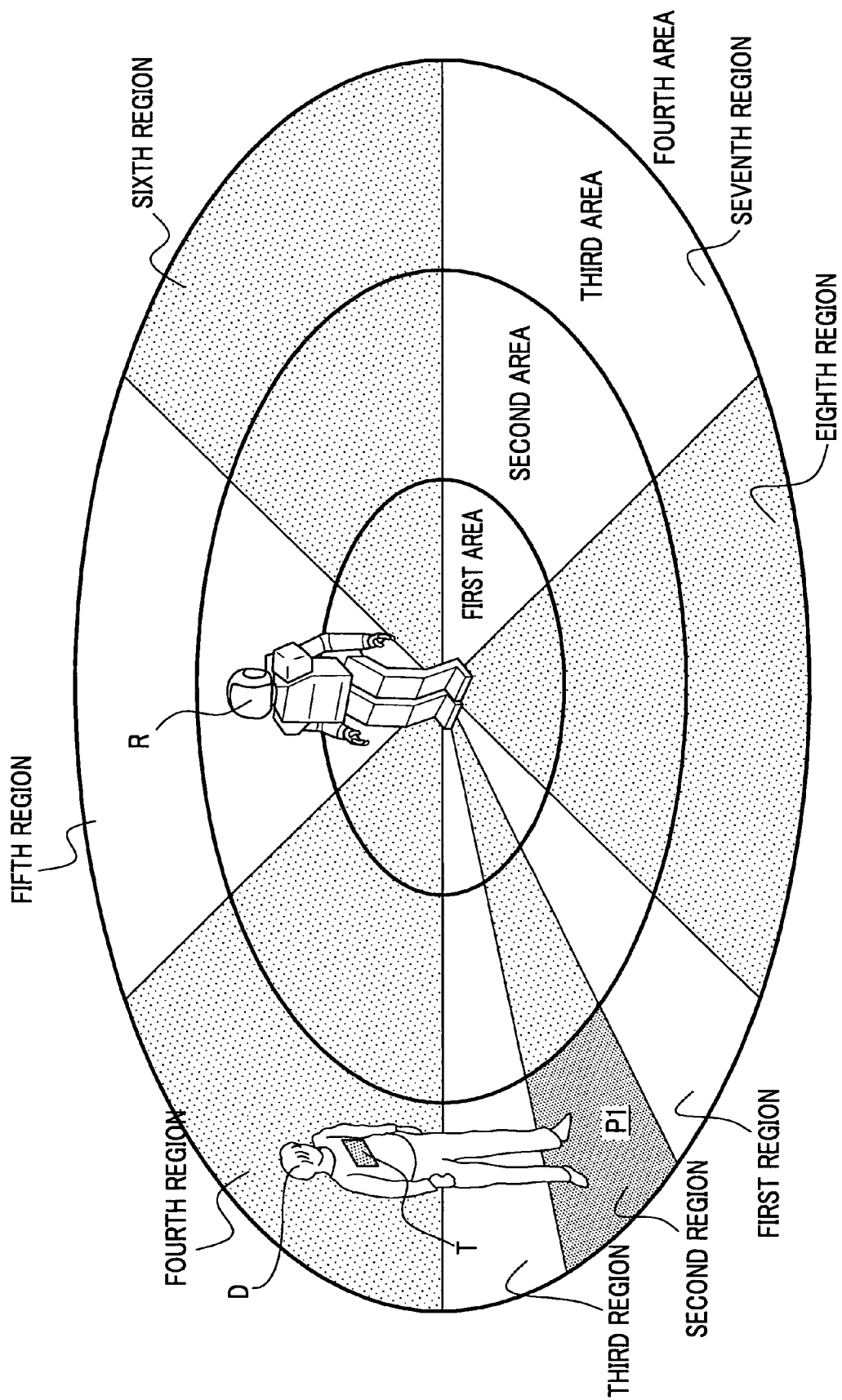
FIG. 6 is an explanatory view of a method for identifying a position of a detection target D based on the acquired area information and direction information.

In this embodiment, as shown in FIG. 6, the surrounding area of the robot R is divided into four areas depending on the distance from the robot R. That is, a first area, a second area, a third area, and a fourth area are established around the robot R in increasing order of distance from the robot R.

In this embodiment, each area is beforehand correlated with the field intensity on the basis of a value of field intensity, and a table (a distance table) which indicates the correlation between the area and the field intensity is stored on the recording unit 110.

Therefore, the position computing part 81*b* refers to the distance table based on the field intensity entered from the field intensity measuring unit 85, and obtains information (area information) which indicates which area among areas (from first area to fourth area) the target object D, which has the tag T that has transmitted the receipt signal, exists in.

Here, for example, if the field intensity α entered from the field intensity measuring unit 85 is between threshold values γ and β (here, γ is a lower limit of the third area and β is an upper limit of the third area), the position computing part 81*b* obtains the area information which indicates the third area.

In this embodiment, the area within 2 meter range from the robot R is defined as first area, the area from 2 meter to 3 meter distance from the robot R is defined as second area, the area from 3 meter to 4 meter distance from the robot R is defined as third area, and the range more than 4 meter from the robot R is defined as fourth area. Here, the relation between the area and the distance from the robot R is not limited to this embodiment. The range of each area may be changed, as appropriate, as long as the field intensity can be measured. Also, the number of the area is not limited to four and may be increased or decreased as appropriate.

The position computing part 81*b* refers to the emitter ID included in the receipt signal entered from the decoder 84, and identifies the light emitter which has emitted an infrared light received by the target object D based on the emitter ID. Then, the position computing part 81*b* obtains information (direction information) which indicates the irradiation direction of the infrared light from the identified light emitter.

In this embodiment, as shown in FIG. 6, a total of eight search regions (from first region to eighth region) are established in the surrounding area of the robot R, and the recording unit 110 stores a table (a direction table) which indicates the search region to which each light emitter is being directed.

Therefore, the data processor 81 refers to the direction table stored on the recording unit 110 based on the emitter ID, and recognizes the search region to which the light emitter identified by the emitter ID has irradiated an infrared light. That is, the search region to which infrared light has been irradiated is determined from among predetermined search regions (from first region to eighth region).

Then, the data processor 81 obtains information indicating the identified search region as the information (direction information) which indicates the direction of the target object D.

In this embodiment, adjoining search regions overlap each other at edge, but the overlapping edge of each search region is omitted from this FIG. 6.

The position computing part 81*b* basically generates information (position information) which indicates the position of the target object D from area information and direction information.

Here, the explanation of position information will be made in detail with reference to FIG. 6.

If the content of area information is "THIRD AREA" and the content of direction information is "SECOND REGION", the data processor 81 regards the overlapping area between "THIRD AREA" and "SECOND REGION" as the position of the target object D, and generates information (position information) which indicates this overlapping area. Here, in FIG. 8 this overlapping area is denoted by a symbol P1.

As described above, the positional relation between the robot R and the target object D is determined based on the intensity of the receipt signal which has received by the robot R and the emitter ID included in the receipt signal. In other words, the direction and distance of the target object D is computed on the basis of the position of the robot R, and the position of the target object D can be determined.

Then, the position computing part 81b outputs the position information to the controller 40 of the robot R together with the tag ID included in the receipt signal entered from the decoder 84.

Thereby, the controller 40 of the robot R determines the motion of the robot R in consideration of the position information, and controls the motion of the autonomous travel controller 50 to actuate the robot R based on the determined motion. In this embodiment, an autonomous travel of the robot to the front of the target object D or an image pickup of the face image of the target object D by adjusting an angle and direction of the camera C can be example as the motion of the robot R.

When the emission request signal is included in the receipt signal, the signal generator 81a generates the direction check signal and outputs the direction check signal to the encryption unit 82. Thereby, an infrared light is emitted from each light emitter of the light emission unit 100.

The controller 40 of the robot R transmits the tag ID to the management computer 3. Thereby, the management computer 3 refers to the recording unit (not shown) based on the tag ID when the tag ID is transmitted from the robot R, and obtains information being correlated with the tag ID to perform the identification of the target object D (person) with tag T. Then, the management computer 3 outputs the obtained information to the robot R together with a command signal which commands the robot R to make a predetermined motion. Thus, the controller 40 of the robot R controls each section, e.g. the autonomous controller 50, of the robot R based on the command signal.

[Management Computer]

Figure 7:
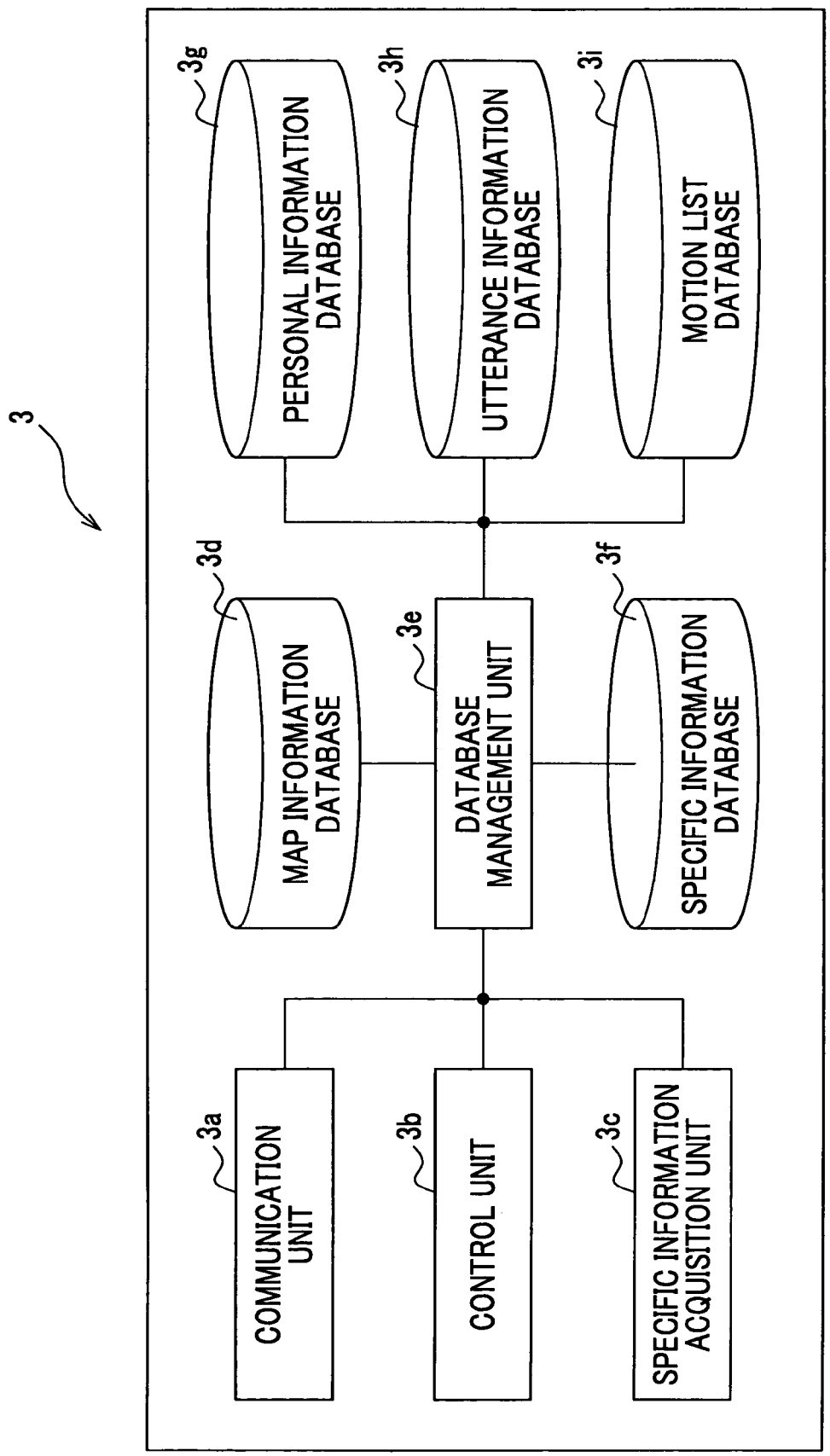
FIG. 7 is a block diagram explaining the function of a management computer of FIG. 1.

FIG. 7 is a block diagram for explaining the function of the management computer shown in FIG. 1.

The management computer 3 includes a communication unit 3a, a control unit 3b, specific information acquisition unit 3c, a map information database 3d, a database management unit 3e, a specific information database 3f, the personal information database 3g, the utterance information database 3h, and a motion list database 3i.

(Communication Unit)

The communication unit 3a communicates with the robot R through the base station 1 (see FIG. 1). The control unit 3b manages overall processings in the management computer 3.

(Specific Information Acquisition Unit)

The specific information acquisition unit 3c has a similar function as the specific information acquisition unit 40i (see FIG. 3) of the controller 40 of the robot R, and extracts specific information. The specific information acquisition unit 3c acquires specific information from the personal information. Here, personal information is extracted from the personal information database 3g by the database management unit 3e based on tag ID, when the tag ID is transmitted from the robot R.

(Map Information Database)

The map information database 3d holds therein map information. A database management unit 3e manages the map information database 3d, the specific information database 3f, and the personal information database 3g, and controls a recording and reproducing of data to each database.

(Specific Information Database)

The specific information database 3f holds therein specific information. Here, for example, it is preferable that specific information is downloaded at regular intervals from the computer, which is connected to the other network, under the control of the control unit 3b.

In this embodiment, the information of festivals held in a local area and a weather forecast are examples of appropriate information as the information to be downloaded at regular intervals.

(Personal Information Database)

The personal information database 3g holds therein personal information. Here, the personal information is correlated with tag ID and is stored on the personal information database 3g. In this embodiment, therefore, the tag ID is used as a search key for searching personal information in the personal information database 3g. However, a serial number may be used as the search key instead of the tag ID. Additionally, a part of information, e.g. a name, an address, language, and a position etc. which are held in the tag may be used as the search key.

(Utterance Information Database)

The utterance information database 3h holds therein fixed utterance patterns such as "Ohayo Gozaimasu (good morning)", "Konnichiwa (good afternoon)", "Ogenkidesuka (how are you)", "hello", "good by" etc. Here, these fixed utterance patterns are listed on the database.

In this embodiment, an appropriate utterance pattern is selected in consideration of personal information and a time etc., when the robot provides a fixed motion such as a greeting. Then, the selected utterance pattern is downloaded from the utterance information database 3h and is used when fixed motion such as a greeting is provided.

(Motion List Database)

The motion list database 3i hold therein fixed motion patterns such as "bowing", "nodding", and "saluting" etc., as well as the utterance information database 3h. That is, control patterns of each section of the robot R is listed on the database. In this embodiment, an appropriate motion pattern is selected in consideration of personal information and a time etc., when the robot provides a fixed motion such as a greeting. Then, the selected motion pattern is downloaded from the motion list database 3i and is used for providing fixed motion.

[Tag]

The tag T receives a radio wave and a light signal which are transmitted from the robot R, and returns the receipt signal, which indicates the receipt of the radio wave or a light signal, to the robot R. In this embodiment, because a person who has a tag T corresponds to the target object D, radio wave and a light signal from the robot R is received by the tag T. Therefore, the explanation of the tag T will be made as follows.

Figure 8:
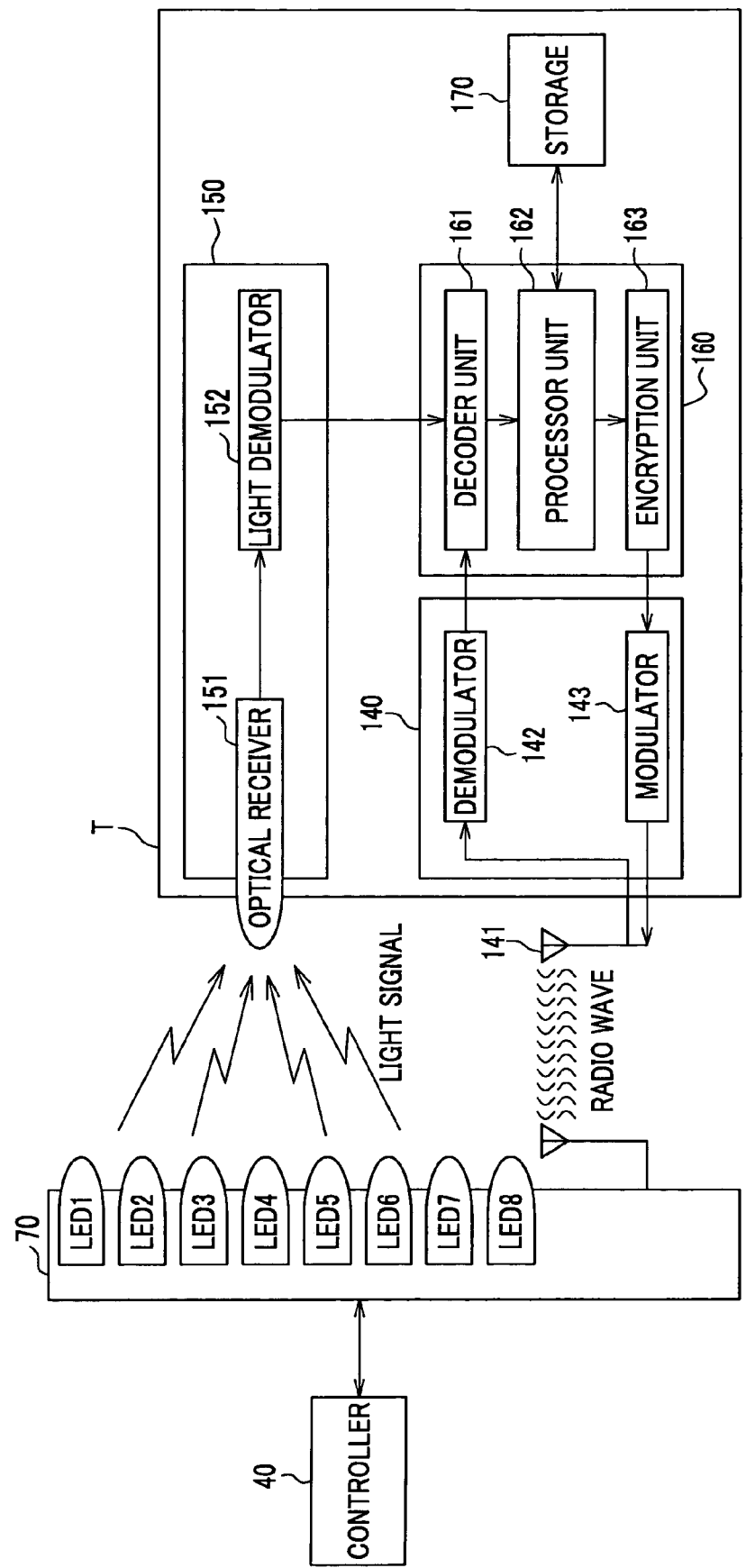
FIG. 8 is a block diagram showing the configuration of a tag T which serves as the detection target D.

As shown in FIG. 8, the tag T includes a radio transceiver 140, a light receiver 150, a receipt signal generator 160, a storage 170.

(Radio Transceiver)

The radio transceiver 140 receives the modulated signal transmitted via wireless from the robot R, and transmits to the robot R via wireless the modulated signal which is obtained by modulating the receipt signal entered from the receipt signal generator 160. The radio transceiver 140 includes an antenna 141, a demodulator 142, and a modulator 143.

The demodulator 142 demodulates the modulated signal, which is transmitted from the robot R and is received through the antenna 141, to obtain the encrypted search signal. Then, the demodulator 142 outputs the encrypted search signal to the receipt signal generator 160.

The modulator 143 modulates the encrypted receipt signal, which is entered from an encryption unit 163 of the receipt signal generator 160, to obtain a modulated signal. Then, the modulator 143 transmits the modulated signal to the robot R via wireless through the antenna 141.

(Light Receiver)

The light receiver 150 receives the infrared light irradiated from the robot R.

The light receiver 150 includes an optical receiver 151 and a light demodulator 152.

The optical receiver 151 receives directly the infrared light (an infrared light signal) irradiated from the robot R. The light demodulator 152 demodulates the infrared light signal received by the optical receiver 151 to obtain the encrypted direction check signal.

To be more specific, when infrared light signal irradiated from the robot R is received by the optical receiver 151, the light receiver 150 demodulates the infrared light signal to obtain the encrypted direction check signal. Then, the light receiver 150 outputs the encrypted direction check signal to the receipt signal generator 160.

(Receipt Signal Generator)

The receipt signal generator 160 generates a signal (receipt signal), which indicates the receipt of the search signal from the robot R.

In this embodiment, this receipt signal is generated in response to the receipt request signal included in the search signal, when the search signal transmitted from the robot R is received by the radio transceiver 140.

Figure 9:
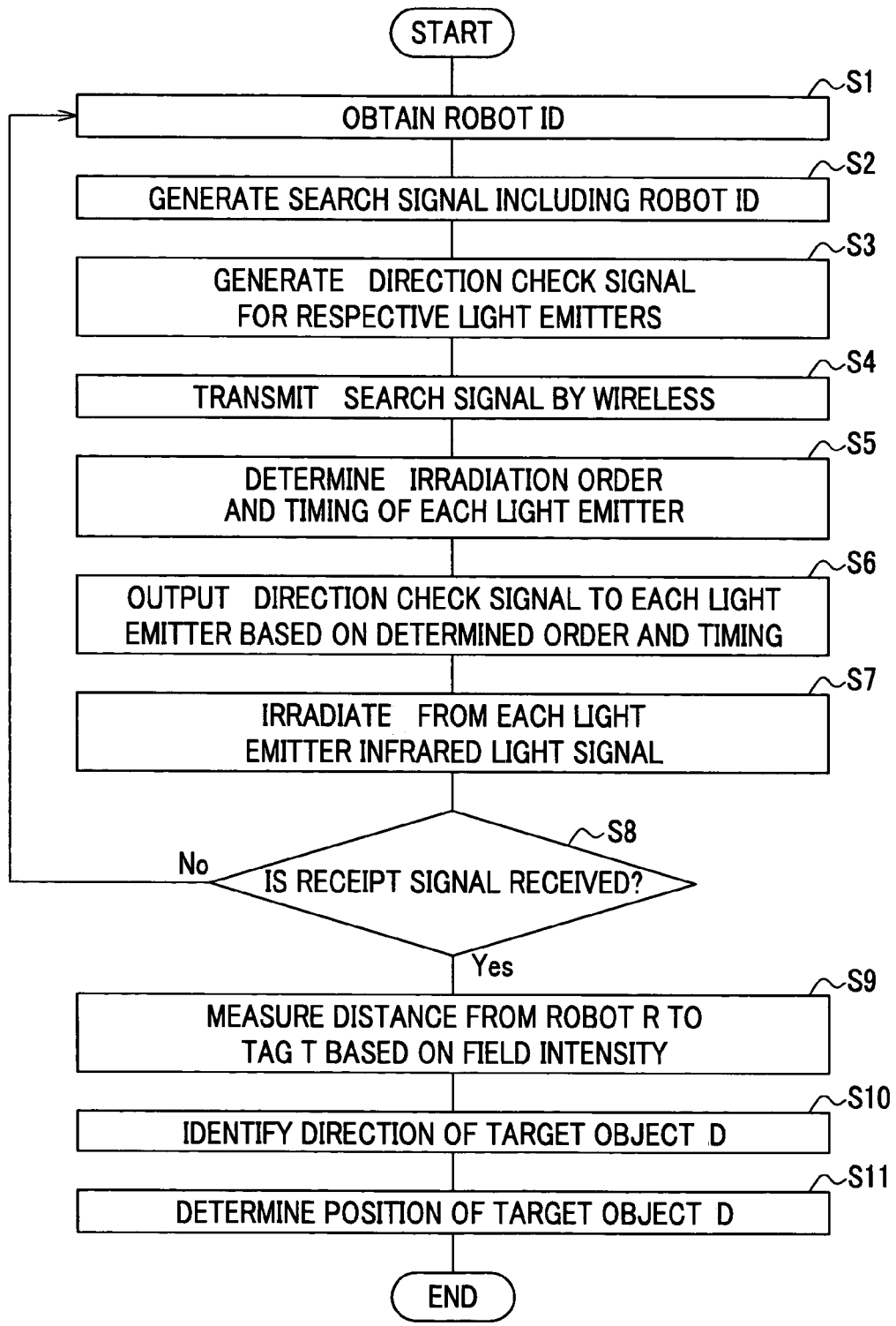
FIG. 9 is a flowchart explaining the processing performed in a target object detection unit 70 of the robot R.

As shown in FIG. 9, the receipt signal generator 160 includes a decoder unit 161, a processor unit 162, and the encryption unit 163.

The decoder unit 161 decodes the encrypted signal to obtain the signal. That is, the decoder unit 161 decodes the encrypted search signal, which is entered from the radio transceiver 140, and the encrypted direction check signal, which is entered from the light receiver 150, to obtain the search signal and the direction check signal, respectively. Then, the decoder unit 161 outputs the search signal and the direction check signal to the processor unit 162.

The processor unit 162 generates the receipt signal. In this embodiment, the search signal includes the robot ID and the receipt request signal. Here, the robot ID is a unique identification number to specify the robot R which has transmitted the search signal. The receipt request signal is a signal which commands the target object D to perform the predetermined processing when the target object D has received the search signal.

The direction check signal includes the robot ID for identifying the robot R which has emitted the direction check signal, and the emitter ID for identifying the light emitter which has emitted the direction check signal.

Thus, the processor unit 162 changes the condition of the light receiver 150 from a standby condition to an activated condition in response to the receipt request signal included in the search signal, when the search signal is entered to the processor unit 162.

When the processor unit 162 receives the direction check signal within a predetermined time after activating the light receiver 150, the processor unit 162 compares the robot ID included in the direction check signal with the robot ID included in the search signal.

The processor unit 162 obtains a unique identification number (tag ID) assigned to the tag T from the storage 170, when the robot ID, which is included in the direction check signal, agrees with the robot ID, which is included in the search signal.

Then, the processor unit 162 generates the receipt signal in which the tag ID, the robot ID included in the search signal, and the emitter ID included in the direction check signal are included, and outputs the generated receipt signal to the encryption unit 163.

On the contrary, the processor unit 162 generates the receipt signal which further includes the emission request signal therein, if the direction check signal is not entered within a predetermined time after activating the light receiver 150 or if the robot ID of the direction check signal disagrees with the robot ID of the search signal. Then, the processor unit 162 outputs the generated receipt signal to the encryption unit 163. Here, the emission request signal is a signal which commands the robot R (detection unit) to emit an infrared light.

The encryption unit 163 encrypts the receipt signal to generate the encrypted receipt signal, and outputs the encrypted receipt signal to the radio transceiver 140.

Thereby, the encrypted receipt signal is modulated in the modulator 143 of the radio transceiver 140 and then transmitted through the antenna 141.

Figure 10:
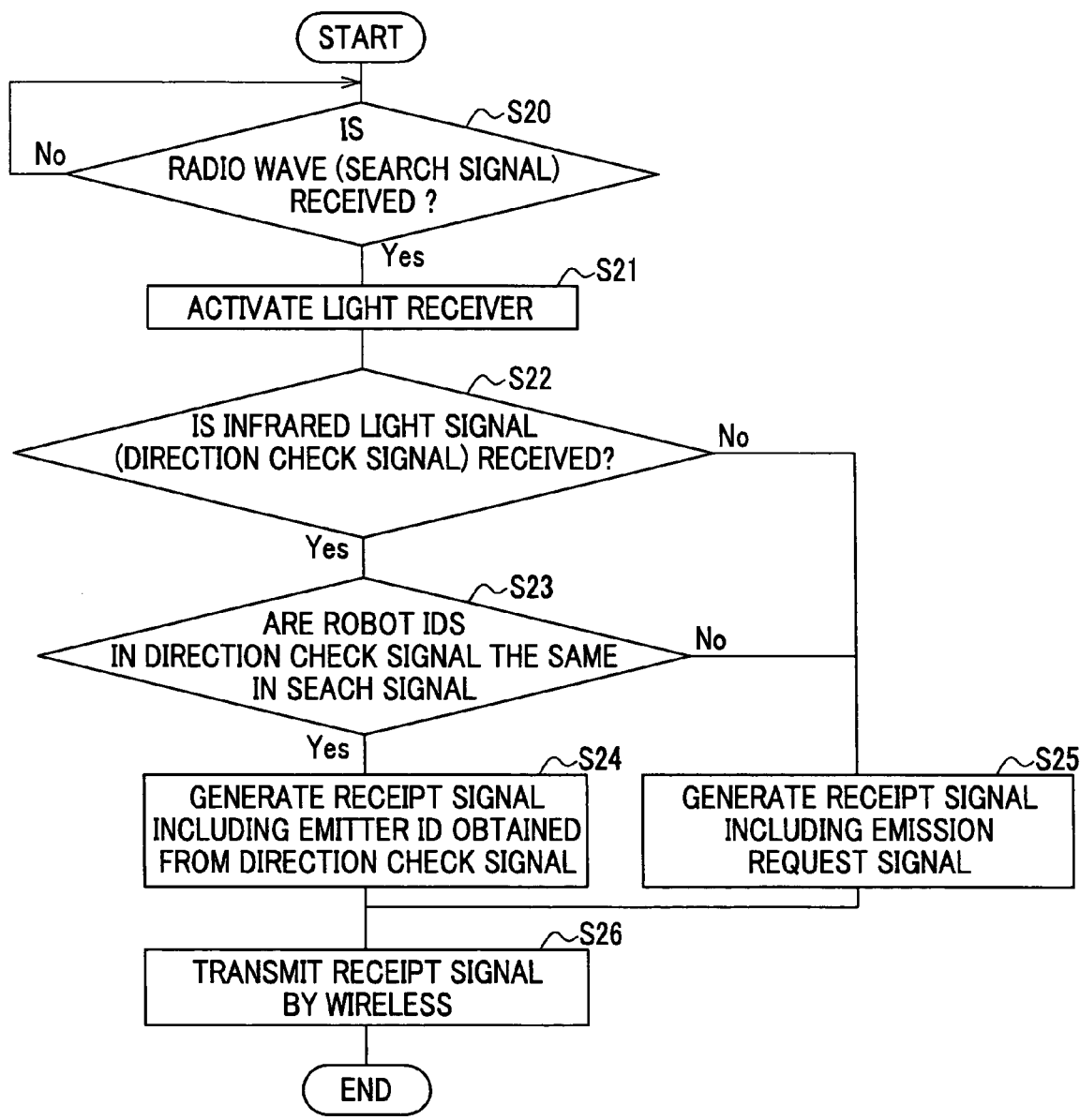
FIG. 10 is a flowchart explaining the processing performed in the tag T which serves as the detection target D.
Figure 11:
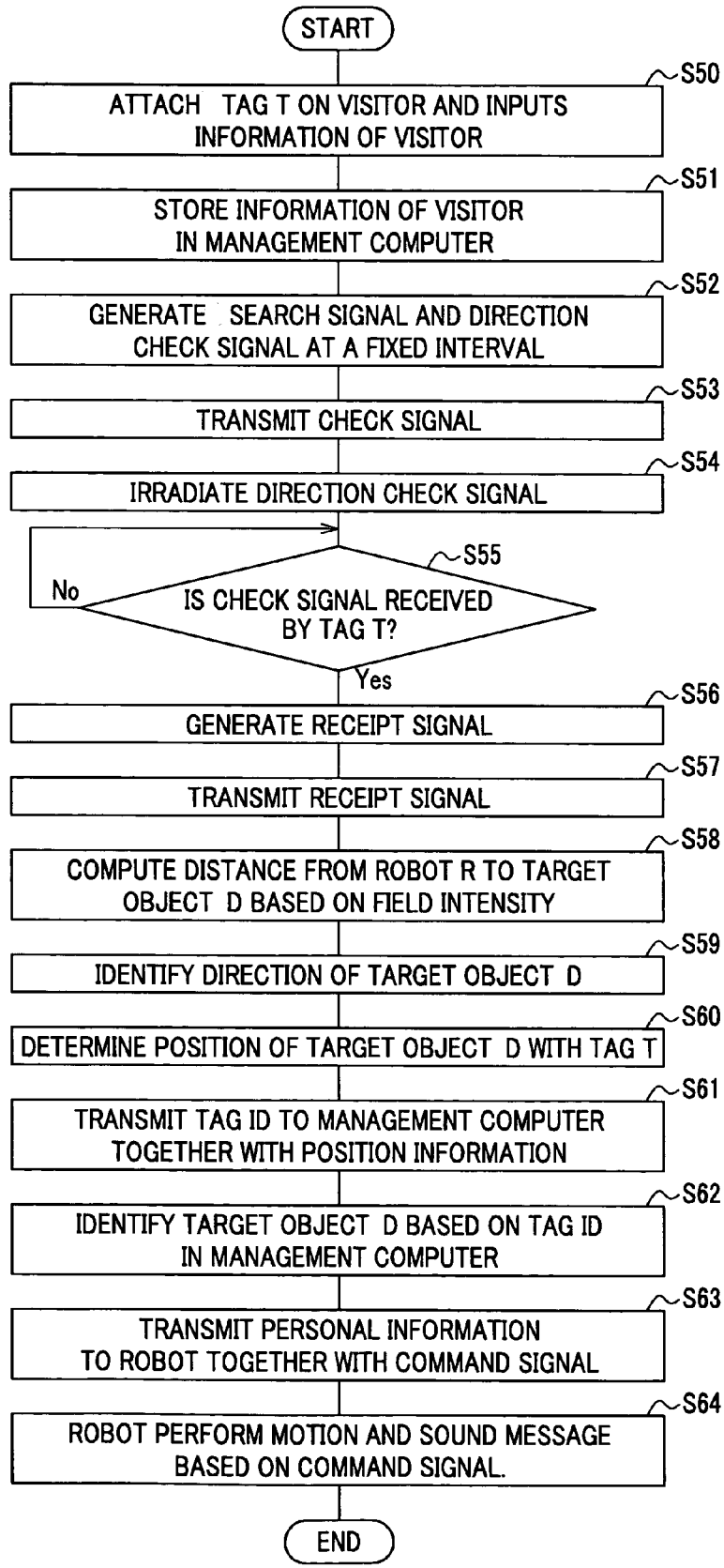
FIG. 11 is a flowchart explaining the processing in the target object detection system when the target object detection system is used for detecting a guest of the office.

Next, the data processing performed in the target object detection system A will be explained with reference to the block diagram of FIG. 4 and flowcharts of FIG. 9 to FIG. 11.

(Signal Processing in the Target Detection Unit)

The signal processing performed in the target detection unit 70 of the robot R will be explained with reference to FIG. 9.

The signal generator 81a of the unit controller 80 refers, at a predetermined cycle, to the recording unit 110, and obtains the unique identification number of the robot R, to which the target detection unit 70 is being provided (step S1). That is, the signal generator 81a obtains the robot ID from the recording unit 110.

Then, the signal generator 81a generates the search signal which includes the robot ID and receipt request signal (step S2). Additionally, the signal generator 81a generates the direction check signal, which is irradiated as an infrared light signal from each light emitter of the light emission unit 100, for respective light emitters (step S3). Here, the direction check signal includes the robot ID obtained in the step S1 and the emitter ID to be used for identifying the light emitter which emits the direction check signal.

The encryption unit 82 of the unit controller 80 encrypts the search signal generated in the signal generator 81a to generate the encrypted search signal, and outputs the encrypted search signal to the radio transmitter-receiver 90. Thus, the encrypted search signal is modulated by a predetermined modulation scheme to generate the modulated signal. Then, the modulated signal is transmitted through the transceiver antenna 93 (step S4). That is, the search signal is transmitted via wireless.

The encryption unit 82 of the unit controller 80 encrypts the direction check signal generated in the signal generator 81a to generate the encrypted direction check signal, and then outputs the encrypted direction check signal to the time division unit 83.

The time division unit 83 determines the irradiation order and timing of each light emitter (LED 1-LED 6) of the light emission unit 100 (step S5), when the encrypted direction check signal is entered from the encryption unit 82. Then, the time division unit 83 outputs the encrypted direction check signal to the modulator of corresponding light emitter (LED 1--LED 6) based on the determined timing (step S6).

The modulator of each light emitter of the light emission unit 100 modulates the encrypted direction check signal by a predetermined modulation manner to obtain the infrared light signal of a predetermined wave length. Then, the infrared light signal is irradiated to the search region from the light emitter adjoining to the modulator (step S7). Thereby, an infrared light is irradiated toward each search region established around the robot R by the determined order and timing.

The tag T generates the receipt signal (modulated signal) and transmits it via wireless, when the tag T receives the search signal (modulated signal) transmitted from the transceiver antenna 93 of the radio transmitter-receiver 90.

The demodulator 92 obtains the encrypted receipt signal by demodulating the modulated signal, when the demodulator 92 receives the modulated signal (receipt signal) transmitted from the tag T. The demodulator 92 outputs the encrypted receipt signal to the decoder 84 and field intensity measuring unit 85 of the unit controller 80.

The decoder 84 of the unit controller 80 decodes the encrypted receipt signal to obtain the receipt signal, and outputs the receipt signal to the data processor 81.

The field intensity measuring unit 85 of the unit controller 80 detects a power of the encrypted receipt signal, which is entered from the demodulator 92 of the radio transmitter-receiver 90, and computes an average of the detected power. Then, the field intensity measuring unit 85 outputs the computed average value to the data processor 81 as the data of the field intensity.

The position computing part 81b refers to the distance table based on the field intensity entered from the field intensity measuring unit 85, and obtains information (area information) which indicates which area among areas (from first area to fourth area) the tag T that has transmitted the receipt signal exists in (step S9).

The position computing part 81b refers to the direction table stored on the recording unit 110 based on the emitter ID, which is included in the receipt signal entered from the decoder 84. Then, the position computing part 81b obtains the information (direction information) which identifies the light emitter which has irradiated an infrared light received by the tag T (step S10).

Then, the position computing part 81b generates the position information which indicates the position of the target object D from area information and direction information (step S11). Thus, the position of the target object D is determined.

If the receipt signal (modulated signal) transmitted from the tag T has not been received by the demodulator 92 of the radio transmitter-receiver 90 (step S8, No), the demodulator 92 keeps the standby condition till the receipt signal (modulated signal) is received.

(Signal Processing in Tag T)

Next, the signal processing to be performed in tag T which serves as the target object D will be made with reference to the block diagram of FIG. 8 and the flow chart of FIG. 10.

When radio wave (modulated signal) transmitted from the robot R has been received through the antenna 141 (Step S20, Yes), the demodulator 142 of the radio transceiver 140 demodulates the modulated signal to obtain the encrypted search signal. Then, the demodulator 142 outputs the encrypted search signal to the receipt signal generator 160.

The decoder unit 161 of the receipt signal generator 160 decodes the encrypted search signal entered from the radio transceiver 140 to obtain the search signal. Then, the decoder unit 161 outputs the search signal to the processor unit 162.

The processor unit 162 of the receipt signal generator 160 changes the condition of the light receiver 150 from a standby condition to an activated condition in response to the receipt request signal included in the search signal (step S21).

When the optical receiver 151 of the light receiver 150 receives the infrared light signal irradiated from the robot R within a predetermined time after activating the light receiver 150 (step S22, Yes), the light demodulator 152 of the light receiver 150 demodulates the infrared light signal to obtain the encrypted direction check signal. Then, the light demodulator 152 outputs the encrypted direction check signal to the receipt signal generator 160.

Thus, the decoder unit 161 of the receipt signal generator 160, to obtain the direction check signal, decodes the encrypted direction check signal and outputs the direction check signal to the processor unit 162.

The processor unit 162 of the receipt signal generator 160 compares the robot ID included in the direction check signal with the robot ID included in the search signal.

If both robot IDs agree each other (step S23), the processor unit 162 generates the receipt signal. Prior to the generation of the receipt signal, the processor unit 162 refers to the storage 170 and obtains the unique identification number (tag ID) assigned to the tag T.

Then, the processor unit 162 generates the receipt signal which includes the tag ID, the robot ID included in the search signal, and the emitter ID included in the direction check signal, and the processor unit 162 outputs the generated receipt signal to the encryption unit 163 (step S24).

Here, the processor unit 162 generates the receipt signal which further includes the emission request signal therein, if the direction check signal is not entered within a predetermined time after activating the light receiver 150 (step S22, No) or if the robot ID of the direction check signal disagrees with the robot ID of the search signal (step S23, No). Then, the processor unit 162 outputs the generated receipt signal to the encryption unit 163.

The modulator 143 of the radio transceiver 140, to obtain the modulated signal, modulates the encrypted receipt signal entered from the encryption unit 163, and then transmits the modulated signal via wireless through the antenna 141 (step S26).

(The Processing in the Target Object Detection System A)

Next, the processing in the target object detection system A, which is adopted to detect the visitor of the office, will be explained with reference to the block diagrams of FIG. 1, FIG. 4, and FIG. 8, the flowchart of FIG. 11.

A visitor of the office, for example, receives the tag T at the reception desk, and information, e.g. a name of the visitor and visiting section, is inputted through the terminal 5 disposed on the reception desk (step S50).

Thus, information entered from the terminal 5 is stored on the recording unit (not shown) of the management computer 3 which connects with the terminal 5 through the network 4 (step S51).

Then, the tag T is provided on the visitor at the reception desk and the visitor begins to travel to the visiting section.

The unit controller 80 of the robot 80 generates the search signal and direction check signal at a fixed interval (step S52), and the search signal is transmitted from the radio transmitter-receiver 90 (step S53).

The direction check signal is modulated in the light emission unit 100, and then the modulated signal is irradiated, as an infrared light signal, to the predetermined search region (step S54).

When the tag T receives the direction check signal in addition to the search signal (step S5, Yes), the receipt signal is generated (step S56), and then the receipt signal is transmitted (step S57) via wireless.

When the unit controller 80 receives the receipt signal transferred via wireless from the tag T, the unit controller 80 computes the distance from the robot R to the visitor provided with the tag T (hereinafter referred to as a "target object D") based on the field intensity of the receipt signal (step S58). The unit controller 80 identifies the light emitter which has irradiated the light signal received by the tag T. Then, the unit controller 80 regards the irradiation direction of the identified light emitter, as the direction of the target object D (step S59). Thereby, the position of the target object D is determined (step S60).

The unit controller 80 of the robot R outputs the position information, which indicates the determined position, and tag ID, which is obtained from the receipt signal, to the controller 40 of the robot R.

The controller 40 of the robot R transmits the tag ID to the management computer 3 together with the position information (step S61). In the management computer 3, the identification (reorganization) of the target object D (person) equipped with the tag T, to which tag ID is assigned, is performed, by searching the recording unit (not shown) based on the tag ID (step S62). Then, the information (personal information) with regard to the identified target object D (person) is transferred to the robot R together with the command signal to be required for actuating the robot R (step S63).

Then, the robot R performs the motion (travel) and have a conversation with a person (step S64), based on the command signal entered from the management computer 3.

In the present invention, for example, the robot R performs the following motions etc. 1) the robot R moves to the front position of the target object D (person) having the tag T, and performs the image pickup of the face image of the target object D, 2) the robot R sounds a voice message such as "Ohayo Mr.", and 3) the robot R sends a predetermined message to the target object D (person).

As described above, the over all and pert of the mobile robot according to the present invention have been explained.

Next, a conversation motion pattern, by which the robot R has a conversation with a person together with a communication motion during the travel of the robot R, will be explained. Here, the explanation of the conversation motion pattern will be made on assumption that the operation area of the robot R is a company as well as the above described embodiment. In this embodiment, however, the operation area of the robot R may be a hospital and administrative institution. Additionally, the operation area may be any of indoor and outdoor. Furthermore, the operation area of the robot R is not limited to a specific area as long as the robot R can determine the route by obtaining map information and move around.

<Conversation Motion Pattern>

Next, the processings in the conversation motion pattern will be explained with reference to FIGS. 1 to 4, FIG. 17, and FIG. 18.

Figure 12:
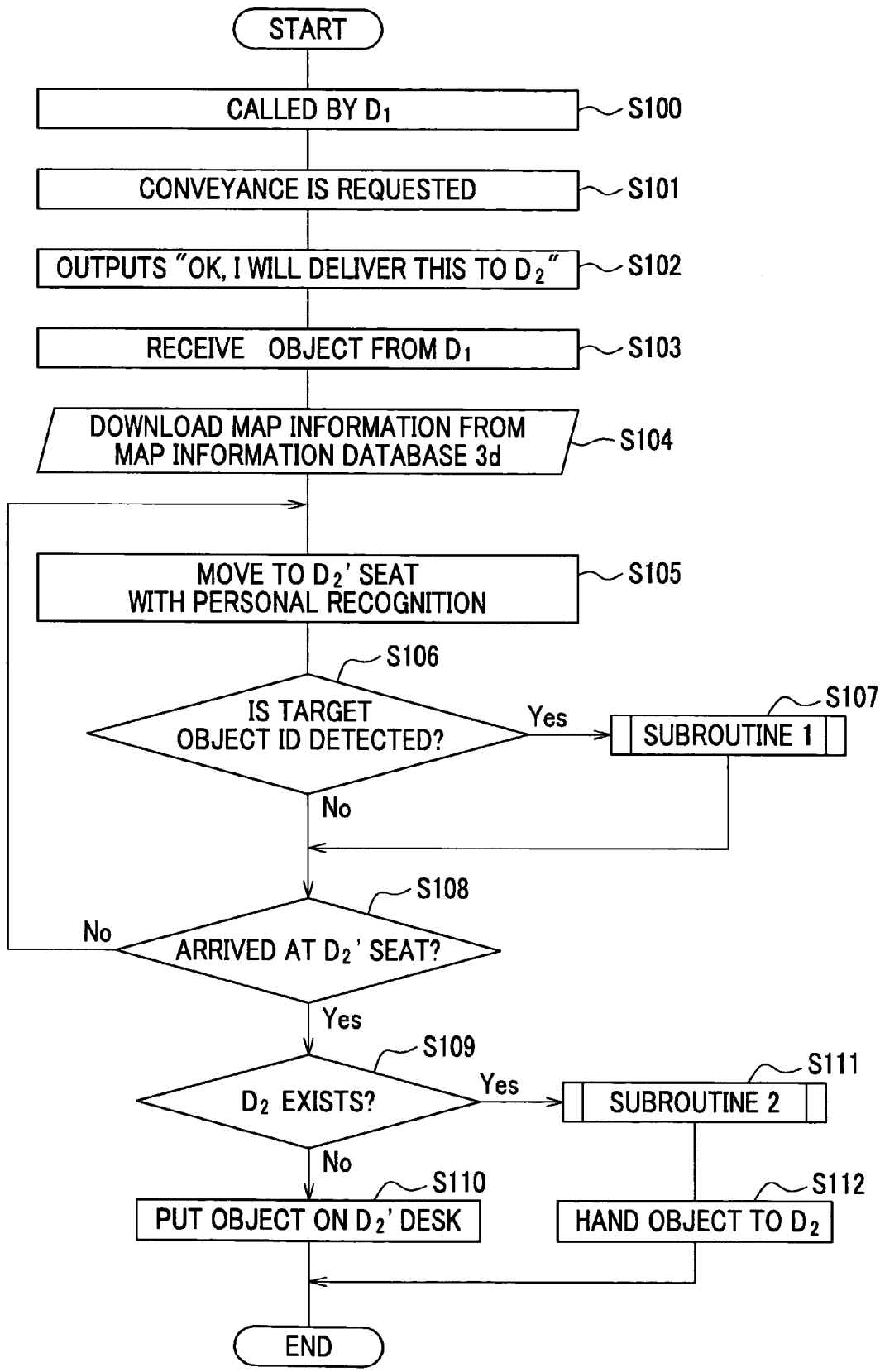
FIG. 12 is a flowchart explaining the motion at the conversation motion pattern of the robot R
Figure 17A:
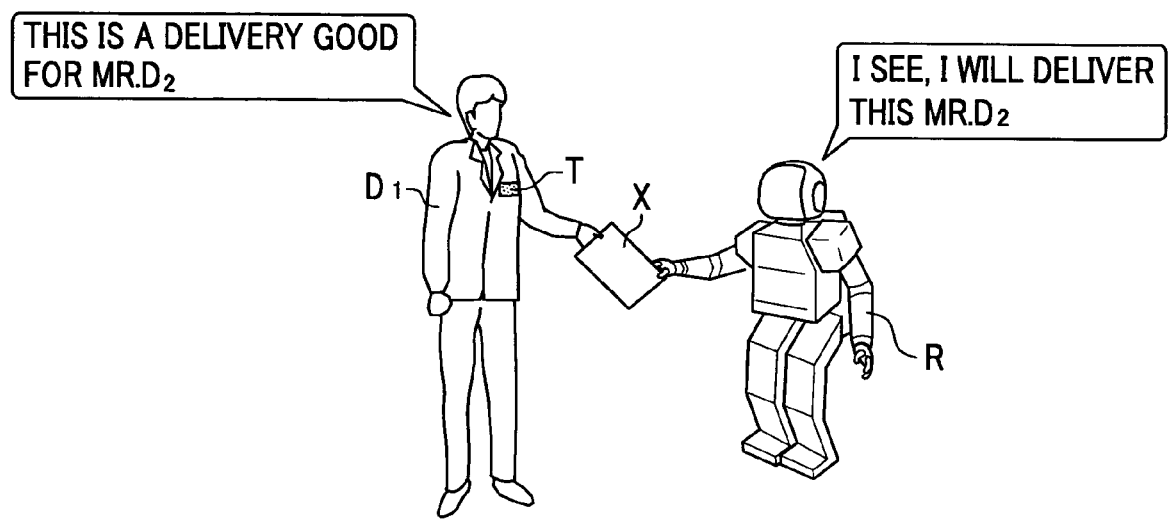
FIG. 17A is an explanatory view explaining a conversation example which is exchanged when a client requests a conveyance (delivery) to the robot R.
Figure 17B:
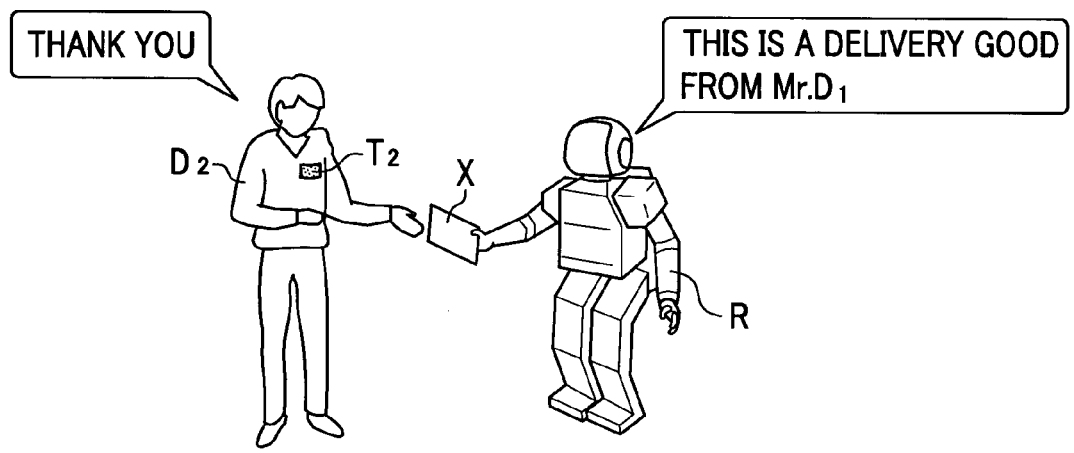
FIG. 17B is an explanatory view explaining a conversation example which is exchanged when the robot hands a delivery good to the client.

FIG. 17 and FIG. 18 are respectively an explanatory view explaining the concept of the conversation. FIG. 17A is an explanatory view explaining a conversation example which is given when requesting the conveyance to the robot R. FIG. 17B is an explanatory view explaining a conversation example which is given during the conveyance. FIG. 18A to FIG. 18C are respectively an explanatory view explaining a greeting example of the robot R that is performed when the robot R passes by a person during the conveyance. FIG. 12 is a flowchart explaining the motion during the conversation motion pattern of the robot R.

In the conversation pattern, when the robot R transfers an object X received from the person D1 to the person D2, the robot R exchanges a conversation with a person D1 or a person D2 and provides the motion derived from a conversation. Also, in this conversation pattern, the robot R provides a greeting motion to a person when the robot R passes by the person during the conveyance of the object X.

In the personal identification unit 40a of the controller 40 of the robot R, the target detection unit 70 senses proximity of the person D1 when the tag T of the person D1 is detected by the target detection unit 70. Next, the tag ID of the tag T is obtained by the target detection unit 70. Then, personal information, which includes data relating to a language of the person D1 specified by the tag ID, is acquired from the personal information database 3g by the personal information acquisition unit 40h.

When the person D1 calls the robot R (step S100), the voice of the person D1 is picked up by the microphone MC and is converted into electric signal. Then, electric signal is supplied to the voice recognizer 21b. In the voice recognizer 21b, voice data is converted into text data with reference to dictionaries which each complies with the language of the person D1. Next, text data is supplied to the controller 40. Then, the conversation controller 40b of the controller 40 performs an interpretation of text data based on the language of the person D1.

In this embodiment, a series of processings from the conversion of voice data into text data to the interpretation of text data are the same irrespective of the contents of voice data. In the following explanations, therefore, these processings are defined as "a voice input processing", and this term is used for indicating these processings instead of explaining the detail of processings.

In the controller 40, when it is recognized that the robot R is called by a person D1 as a result of an interpretation of voice from the person D1 by the voice input processing, the operation determination unit 40c detects the tag T of the person D1 by the target detection unit 70, and then the information relating to the direction and distance of the tag T is obtained. Next, the operation determination unit 40c generates a command by which the robot R moves to the person D1 who is in the position specified by the information relating to the direction and distance of the tag T, and then outputs the command to the locomotion controller 40g.

Here, it is preferable that the robot R is controlled so that the robot R stops a predetermined distance short of the position specified by the acquired distance. Here, the predetermined distance can be appropriately determined as long as the person does not feel a discomfort or intimidation against the robot R when the robot R has a communication with the person D1.

Thereby, the robot R starts a conversation with the person D1 after the robot R approaches the person D1 and arrives at the position predetermined distance apart from the person D1.

As shown in FIG. 17A, in the controller 40, the meaning of the utterance by the person D1 is analyzed, when the person D1 requests the conveyance of the object to the robot R together with the utterance "this is a delivery for Mr. D2, please hand this Mr. D2". In this case, the operation determination unit 40c considers that a conveyance is requested (step S101), based on the analysis result of the voice message obtained by the voice input processing.

Then, in the controller 40, the conversation controller 40b generates text for reply in Japanese which is a language the person D1 uses. Then, the voice synthesizer 21a performs a voice synthesis based on the generated text to output from the speaker S the synthesized voice of "OK, I will hand this to Mr. D2" (step S102).

In this embodiment, a series of processings from the generation of the text for reply to the output of the voice message synthesized from the text are the same irrespective of the contents of the utterance. In the following explanations, therefore, these processings are define as "a voice output processing", and this term is used for indicating these procesings instead of explaining the detail of processings.

Then, the conveyance controller 40f of the controller 40 actuates the arm R2 by the arm controller 51b of the autonomous travel controller 50, and receives the object X from the person D1 (step S103).

Next, the map information acquisition unit 40e of the controller 40 requests map information, which is a map data with regard to the route from the current position (the position of D1's seat) to the destination (the position of D2' seat), to the management computer 3.

In the management computer 3, the database management unit 3e searches the map information database 3d to obtain map information, and then the map information is transferred to the robot R by the communication unit 3a. In the robot R, route determination unit 40d selects the shortest route with reference to map information, when map information is obtained by the map information acquisition unit 40e of the controller 40. Then, the route determination unit 40d determines the selected route as the route from the current position to the destination (step S104).

Then, the operation determination unit 40c supplies the command, by which the robot R moves along the determined route to the position of the person D2, to the autonomous travel controller 50.

In the autonomous travel controller 50, the leg controller 51c actuates the leg R3 in accordance with the command from the controller 40 so that the robot moves ahead along the determined route. Also, the head R1, the arm R2, and the leg R3 are actuated by the head controller 51a, the arm controller 51b, and the leg controller 51c, respectively, so that the robot R moves toward the seat of the person D2 while controlling the shift of the center of gravity of the robot R (step S105).

During the travel of the robot R, the target detection unit 70 checks whether or not the target object D with tag T exists in the surrounding area of the robot R. Also, the target detection unit 70 searches the surrounding area to identify the position of the target object D, and then the information obtained as a result of the search is supplied to the personal identification unit 40a.

The controller 40 considers that the person is discovered (step S106, Yes), when the target object D is detected by the personal identification unit 40a, and then the processing proceeds to subroutine 1 (step S107) relating to the greeting motion. Thus, the robot R greets with the detection target D.

If the person D2 is not at the seat (step S109, No), the operation determination unit 40c outputs the command, by which the robot R puts the object received from the person D1 on the desk of the person D2 by actuating the arm R2 under the control of the arm controller 51b of the autonomous travel controller 50, to the conveyance controller 40f. Then, the processing is terminated (step S110).

If the person D2 is at the seat (step S109, Yes), on the other hand, the processing proceeds to subroutine 2 (step S111) relating to the conversation motion. Thereby, the robot R provides the conversation motion against the person D2 under the control of the conversation controller 40b.

When the conversation motion of step S111 is terminated, the conveyance controller 40f actuates the arm R2 by the arm controller 51b of the autonomous travel controller 50 so that the robot hands the object, which was received from the person D1, to the person D2. Then, the processing is terminated (step S112).

Next, the processing in the subroutine 1 relating to the greeting motion will be explained with reference to the flowchart shown in FIG. 13.

In the processing in the flowchart shown in FIG. 12, the subroutine 1 is performed, when the personal recognition unit 40a recognizes the person during the walking (locomotion) of the robot R by the target detection unit 70. That is, the subroutine 1 is performed, when the detection target D is detected (step S106, Yes).

The personal identification unit 40a obtains the tag ID of the tag T provided on the detection target D which was detected by the target detection unit 70 (step S200).

Then, personal information of the detection target D associated with the tag ID is obtained by the personal information acquisition unit 40h (step S201), when the personal identification unit 40a receives the tag ID from the target detection unit 70.

The communication motion determination unit 40k judges whether or not the detection target D is a candidate of the target for greeting (greeting target), based on the personal information and the information relating to the task command (step S202).

For example, the communication motion determination unit 40k considers that the detection target D is not a candidate (step S202, No), when the information relating to the task command indicates that the greeting is not required for the central figure, i.e. a client (person D1) and a recipient (person D2), of the task in progress. Then, the communication motion determination unit 40k determines not to provide the greeting motion, and thus the processing is terminated.

When the communication motion determination unit 40k considers that the detection target D is a candidate (step S202, Yes), the contents of the greeting are generated and are temporally stored on a recording unit (not shown) of the controller 40 (step S203). Here, the contents of the greeting (the detail of utterance and motions at the time of the greeting) are generated based on personal information obtained in the step S201 in preparation for a passing with a greeting. Also, in this embodiment, the detail of utterance and motions at the time of the greeting are downloaded from the utterance information database 3h and the motion list database 3i of the management computer 3. Thereby, the processing for generating the contents of the greeting is completed at short times.

The communication motion determination unit 40k obtains the information relating to the operation state of the robot R from the operation determination unit 40c and checks whether or not the robot R is walking (step S204).

When the robot R is walking (step S204, Yes), the communication motion determination unit 40k obtains the positional information of the candidate of the detection target D, which is a greeting target, through the position information acquisition unit 40l (step S205). Then, the communication motion determination unit 40k judges whether or not the candidate is a true detection target D (step S206).

In this embodiment, the greeting to be performed when the robot R passes by the person is performed only when the candidate of the detection target D is detected within a predetermined region in front of the robot R.

Also, the position identification of the candidate of the greeting target may be performed by the target detection unit 70. In this embodiment, it is assumed that the target to which robot R provides a greeting exists in front of the robot R. Therefore, the direction and distance of the face of the person who is the greeting target can be identified with high accuracy, by using the result of the analysis performed on the image obtained from two cameras by the image processor 10.

Figure 16B:
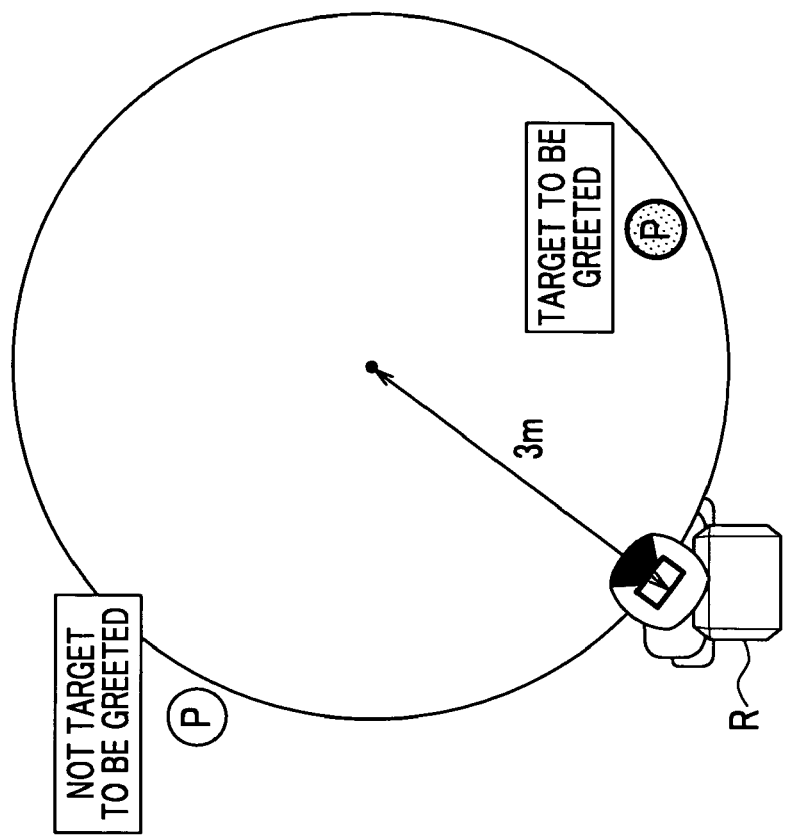
FIG. 16 is an explanatory view showing the judgment of whether or not the detected person is the greeting target when the robot R detects the person during the locomotion of the robot.
Figure 16A:
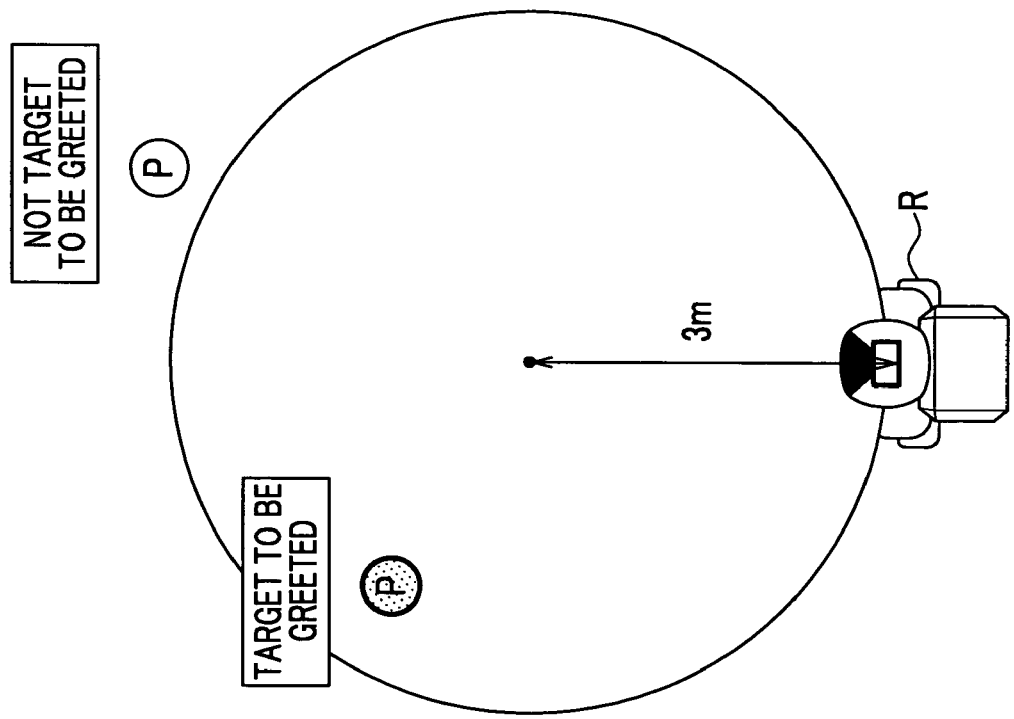

As shown in FIG. 16A and FIG. 16B, when the candidate exists in a predetermined region (a circle region with a radius of 3 meter), a candidate P within the predetermined region is considered as a target to be greeted (step S206, Yes). Then, the processing proceeds to the step S207.

Here, the center of the circle region with a radius of 3 meter exists on the position 3 meter ahead of the robot R, and this circle region exists in the direction to which the face of the robot R is directed. That is, the circle region exists in the direction to which each cameras C is directed.

On the contrary, when the candidate P exists outside of the predetermined region (the circle region with a radius of 3 meter), the candidate is not considered as the target to be greeted (step S206, No). Then, the communication motion determination unit 40k determines not to provide the greeting motion by the robot R, and thus the subroutine 1 is terminated.

Here, the standard for judging whether or not the candidate is the target to be greeted may be determined depending on a property of the target detection unit or surroundings of the region in which the robot R moves around.

For example, the circle region with a radius of 2 meter or an elliptical region may be adopted as the predetermined region. Additionally, as shown in FIG. 6, the overlapped regions of the first region, the second region, the third region, the first area, the second area, and the third area may be adopted as the predetermined region.

Next, the communication motion determination unit 40k determines which one of a normal greeting motion and a particular greeting motion is carried out against the detection target D which is considered as the greeting target in the step S206 (step S207). Here, the determination is performed based on the standard of the greeting motion relating to the task command.

For example, the communication motion determination unit 40k refers to personal information of the detection target D, and determines not to provide the normal greeting motion when the detection target D is a president of a company or a valued customer (step S207, No). In this case, the robot R stops walking at the step S209. That is, the robot R provides a pre-motion of greeting, e.g. the motion of deep bowing.

When the communication motion determination unit 40k determines to provide the normal greeting motion (step S207, Yes), the processing proceeds to the subroutine 3 (step S208). Thereby, the operation determination unit 40c adjusts the start timing of the greeting motion, and provides the pre-motion of the greeting motion by controlling each controller (51a, 51b, and 51c) of the autonomous travel controller 50 (step S209). In this case, for example, the motion of directing the face of the robot R toward the greeting target etc. is performed.

A series of greeting motions of: the greeting motion (step S209); the multilingual voice synthesis (step S210); and the greeting utterance (step S212), is performed after performing the pre-motion of the greeting motion. Then, the subroutine 1 is terminated.

Here, the motion of raising the right hand (FIG. 18A), the motion of greeting with nod (FIG. 18B), and the motion of deep bowing (FIG. 18C) etc. are the examples of the greeting motion. Here, these motions are provided while actuating at least one of the head R1, the arm R2, and the leg R3, by the corresponding controllers of the autonomous travel controller 50.

Also, the voice message such as "Hello Mr.X" (FIG. 18A), "Ohayo Mr.X" (FIG. 18B), and "Ohayo Gozaimasu President X" (FIG. 18C) are the example of the greeting utterance, and these messages are sounded from the speaker S under the control of the voice processor 20.

In the multilingual voice synthesis (step S211), the voice data to be uttered at the greeting utterance (step S212) is generated by the voice synthesizer 21a compatible for the language of the person.

Here, when the robot R provides the greeting motion or greeting utterance, the robot R directs the Robot's face toward the person (greeting target) so that the person (greeting target) does not feels a discomfort. Next, the operation determination unit 40c generates the command, by which the robot R directs the robot's face toward the person (greeting target) based on positional information obtained by the position information acquisition unit 40l of the person (greeting target). Then, the operation determination unit 40c outputs the generated command to the head controller 51a of the autonomous travel controller 50.

Then, after directing the face of the robot R toward the target for greeting, the communication motion determination unit 40k outputs the command to each controller (51a, 51b, and 51c) of the autonomous travel controller 50 so that the robot R provides the greeting motion, e.g. the motion raising the right hand and the motion of bowing etc. In this embodiment, this motion (the pre-motion of the greeting motion) of directing the face toward the target for greeting is performed in the step S209. However, the pre-motion may be performed as part of the greeting motion (step S210). Also, the pre¥motion may be performed prior to the motion of FIG. 18A or the motion of FIG. 18B.

When the robot R is not walking (step S204, No), the communication motion determination unit 40k judges whether or not the candidate of the greeting target is a true target based on a standard (step S214). Here, this standard is different from the standard which is used when this judgment is performed while the robot R is walking. When the robot R is not walking, the target within the circle region whose radius centering on the position of the robot R is 3 m is considered as the greeting target.

Then, the communication motion determination unit 40k specifies the position of the candidate of the greeting target, based on positional information of the candidate acquired by the position information acquisition unit 40l (step S213), and then checks whether or not the candidate exists in the circle region with a radius of 3 meter.

The communication motion determination unit 40k considers that the candidate is not the greeting target (step S214, No), when the candidate is outside of the circle region. Then, the communication motion determination unit 40k decides not to provide the greeting motion and terminates the subroutine 1.

Here, positional information detected by the target detection unit 70 is used for specifying the position of the candidate of the greeting target.

In the target detection unit 70, the position computing part 81b measures the distance from the robot R to the detection target D with the tag T based on the field intensity of the radio wave from the tag T. Here, the intensity of the radio wave is measured by the field intensity measuring unit 85.

As described above, the candidate within the second area or the first area is considered as the greeting target, when the range of the second area is defined as the distance between 2 meter and 3 meter from the robot R.

The measurement of the distance using a radio wave with less directivity is easy, when the judging of whether or not the candidate is the greeting target is performed based on only the distance from the robot R. In this embodiment, however, the measurement of the distance may be performed using the acquired image which is obtained by the image processor 10 using cameras C in order to specify the position of the detection target D. In this case, it is preferable that the robot R is operated so that the direction of the body or face of the robot R is changed to keep the detection target D within the range of the image pickup by the cameras C.

The communication motion determination unit 40k outputs the command, by which the robot provides the pre-motion of the greeting motion against the greeting target, to the operation determination unit 40c (step S209), when the communication motion determination unit 40k detects the greeting target while the robot R is not in walking (step S214, Yes).

Here, the pre-motion of the greeting motion is performed, when the robot R detects the greeting target and if the face of the robot R is not directed to an appropriate direction or the distance from the robot R to the target is not sufficient.

In this embodiment, the motions of: making the robot R to direct the body of the robot R toward the greeting target when the greeting target is in the side or back of the robot R; making the robot R move to the appropriate position distant from the greeting target when the distance from the robot R to the greeting target is too far; and making the robot R to direct the face of the robot R toward the greeting target, are the example of the pre-motion of the greeting motion The communication motion determination unit 40k determines the detail of the pre-motion and generates the command by which the robot provides the determined pre-motions. Then, the communication motion determination unit 40k outputs the command to the operation determination unit 40c. Thereby, for example, the robot R provides the following motions: the robot R directs the body of the robot R toward the greeting target; the robot R approaches the greeting target; and the robot R stop the walking.

The operation determination unit 40c provides the instruction to the autonomous travel controller 50 through the specific information acquisition unit 40i and the locomotion controller 40g etc. Here, the detail of the instruction is determined in accordance with the contents of the pre-motion of the greeting motion. Thereby, each section of the robot R is actuated to provide the pre-motion of the greeting motion by the robot R.

When the pre-motion is finished (step S209) and the robot R is ready for the greeting motion against the greeting target, the communication motion determination unit 40k performs the motions in order of: the greeting motion (step S210); the multilingual voice synthesis (step S211); and the greeting utterance (step S212). Here, the detail of these motions is determined in accordance with the contents of the greeting motion determined by the communication motion determination unit 40k. Then, the subroutine 1 is terminated.

Figure 15:
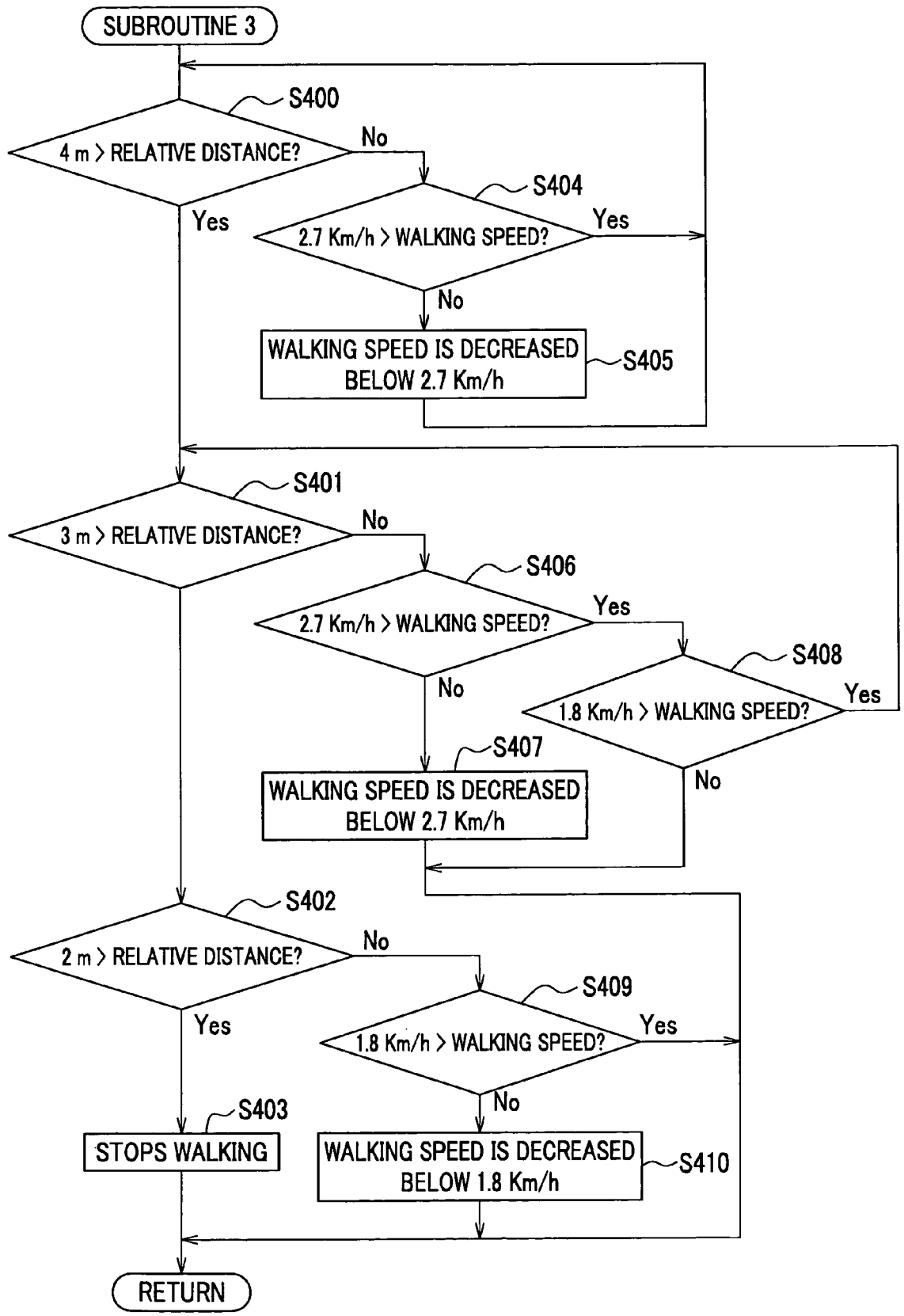
FIG. 15 is a flowchart explaining the adjustment of the start timing of the greeting motion to be performed when the mobile robot provides the passing with a greeting during conversation motion pattern.

Next, the adjustment of the start timing of the greeting motion which is performed in subroutine 3 when the robot R performs the passing with greeting (step S207, Yes) will be explained with reference to the flowchart of FIG. 15.

In order to perform the passing with greeting without causing a discomfort on the person, the prediction of the time of when the robot R passes by the person is required to provide the greeting motion at an appropriate timing. Here, the predicted time of when the robot R passes by the person is defined as "prediction time".

Here, the prediction time is predicted based on the distance from the robot R to the detection target D and on the moving speed of the robot R, in order to allow enough time for starting the communication motion.

In this embodiment, therefore, the start timing is determined so that the communication motion is started several seconds before the prediction time or is started several meters before the detection target D. Also, the start timing is adjusted in consideration of time lag between the instruction of the command and start time of the motion.

Here, the prediction is performed on the assumption that the detection target D is moving at 2.7 km/h in an inverse direction with respect to the moving direction of the robot R. In other words, the prediction is performed on the assumption that the detection target is moving toward the robot R.

In the example of the present embodiment, the relative distance between the robot R and the greeting target is classified into three levels, and the start timing of the utterance motion and the greeting motion is determined based on the relation between the classified level and the walking speed of the robot R.

Here, the relative distance is computed by using the distance which is obtained by the position information acquisition unit 40l from the image processor 10 and the cameras C. But, the distance which is detected by the target detection unit 70 may be used to compute the relative distance.

Additionally, the locomotion speed detection unit 40m computes the locomotion speed (walking speed and speed of the robot R). When the change of the speed is required, the operation determination unit 40c commands the autonomous travel controller 50 from the locomotion controller 40g to change the speed.

Here, the processing in the subroutine 3 will be explained.

Firstly, it is checked whether or not the relative distance between the robot R and the greeting target is below 4 meter (step S400).

When the relative distance is not below 4 meter (step S400, No), the communication motion determination unit 40k checks whether or not the walking speed is below 2.7 km/h (step S404). When the walking speed is below 2.7 km/h (step S404, Yes), current walking speed is kept. When walking speed is not below 2.7 km/h (step S404, No), on the other hand, the walking speed of the robot R is decreased to 2.7 km/h, and then the processing returns to the step S400.

When the relative distance is below 4 meter (step S400, Yes), further checked whether or not the relative distance is below 3 meter (step S401).

When the relative distance is not below 3 meter (step S406, No), the communication motion determination unit 40k checks whether or not the walking speed is below 2.7 km/h (step S406). When walking speed is not below 2.7 km/h (step S406, No), since the walking speed is too fast for providing the greeting motion, the walking speed of the robot R is decreased to 2.7 km/h (step S407), and then the processing in the subroutine 3 is terminated.

Figure 13:
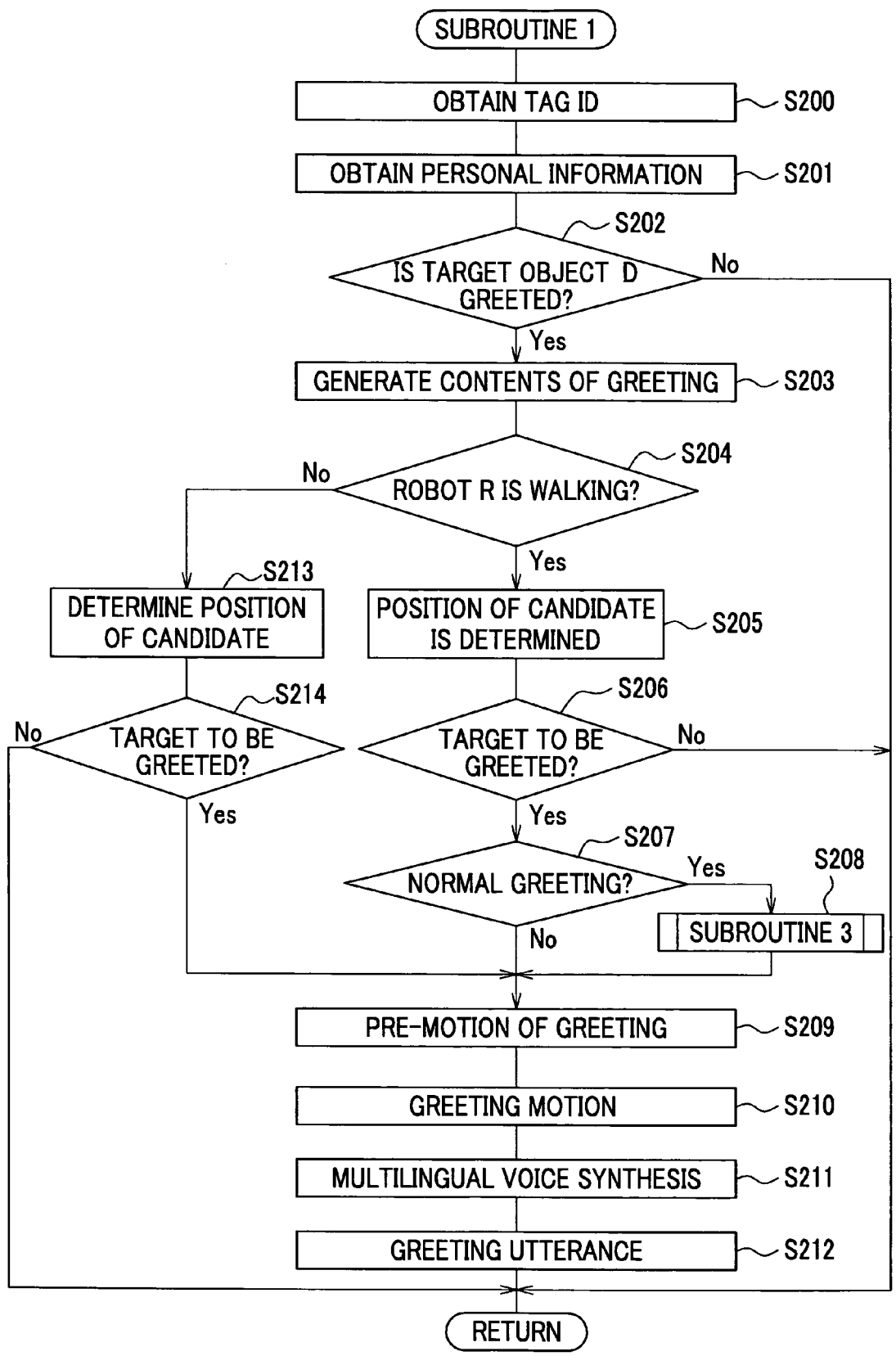
FIG. 13 is a flowchart explaining the greeting motion of the robot R to be performed when the robot R detects a person in a surrounding area of the robot R during the conversation motion pattern.

In the processing in the subroutine 1, as shown in FIG. 13, when the processing in the subroutine 3 is terminated (step S208), the following greeting motions are performed: the pre-motion of the greeting motion (step S209); the greeting motion (step S210); the multilingual voice synthesis (step S211); and the greeting utterance (step S212).

Returns to the flowchart shown in FIG. 15, when the walking speed is below 2.7 km/h (step S406, Yes), it is further checked whether or not the walking speed is below 1.8 km/h (step S408).

When the walking speed is not below 1.8 km/h (step S408, No), the processing in the subroutine 3 is terminated while keeping current walking speed of the robot R. Then, the greeting motion begins to start.

Since it is too fast for the start timing of the greeting motion when the walking speed is below 1.8 km/h (step S408, Yes), the processing returns to the step S400.

When the relative distance is below 3 meter (step S401, Yes), further checked whether or not the relative distance is below 2 meter (step S402). When the relative distance is not below 2 meter (step S402, No), it is checked whether or not the walking speed is below 1.8 km/h (step S409).

If the walking speed is not below 1.8 km/h (step S409, No), the walking speed is decreased to 1.8 km/h (step S410) so as not to upset the timing. Then the processing in the subroutine 3 is terminated.

If the walking speed is below 1.8 km/h (step S409, Yes) the processing in the subroutine 3 is terminated while keeping the walking speed of the robot R. Since the timing is already lost when the relative distance is below 2 meter (step S402, Yes), the robot R stops the walking (step S403). Then, the processing in the subroutine 3 is terminated and the greeting motion is started immediately.

As described above, the start timing of the greeting, which is performed when the robot R passes by the person, is determined based on the relation between the relative distance between the robot R and the greeting target and walking speed of the robot R. Thus, the robot R provides the greeting motion and greeting utterance at an appropriate timing, such as just before the robot R passes by the greeting target. Therefore, the robot R can provide a greeting to the person without causing a discomfort on the person (greeting target).

When the robot R passes by the greeting target at wide passage or open space, the greeting target may exist at an oblique direction with respect to the moving direction of the robot R. In this case, the prediction time (time until the robot R passes by the greeting target) may be short in comparison to the case when the greeting target exists on the moving direction of the robot R.

Under this kind of mobile environment of the robot R, the timing can be adjusted appropriately by considering the relative distance between the robot R and the greeting target in the moving direction of the robot R as the relative distance of the present invention.

Figure 14:
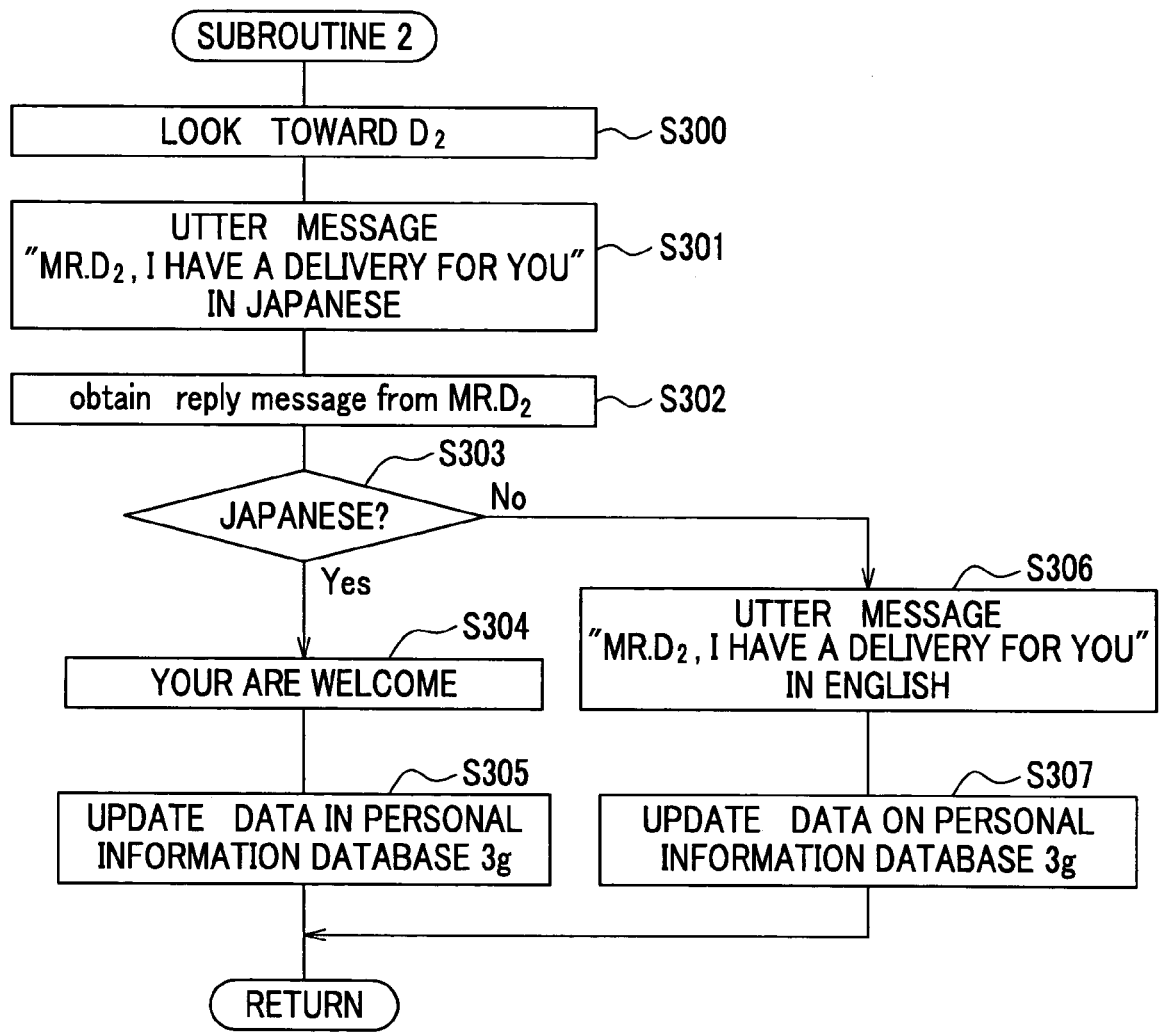
FIG. 14 is a flowchart explaining the conversation motion of the robot R to be performed together with the multilingual voice synthesis during the conversation motion pattern.

Finally, the processing in the subroutine 2 relating to the conversation motion will be explained with reference to the flowchart shown in FIG. 14.

Here, it is shown the case that the robot R performs a multilingual recognition with regard to the target for conversation (conversation target).

As shown in FIG. 12, in the processing in the subroutine 2, the robot R has a conversation with the person D2, when the person D2 who is a recipient of the object is in the seat of the person D2.

The operation determination unit 40c refers to the positional information of the person D2, and generates the command by which the robot R directs the robot's face toward the person D2. Then, the operation determination unit 40c outputs the voice message in language which is determined based on the personal information of the person D2. Here, if the content about language of the person D2 is not included in the personal information, since Japanese is a default language, the robot utters Japanese voice message "this is a delivery from Mr. D2".

The voice recognizer 21b obtains voice data from the reply message uttered by the person D2 (step S302), and checks whether or not the voice of the person D2 is Japanese (step S303).

When the reply message from the person D2 is "thank you" in Japanese (step S303, Yes), the voice recognizer 21b recognizes that the voice of the person D2 is Japanese. Then, the conversation controller 40b obtains information which indicates that the voice is Japanese.

The conversation controller 40b recognizes the meaning of the reply message from the person D2, and utters "you are welcome" in Japanese under the control of the voice synthesizer 21a (step S304). Then, the conversation controller 40b updates the data relating to the person D2 which is stored on the personal information database 3g, and terminates the processing in the subroutine 2. Here, the updating of data relating to the person D2 is for example the data about the language the person D2 uses.

When the language of the person D2 is not Japanese but English and the person D2 replies the message "I'm sorry. I cannot understand Japanese." in English, the voice recognizer 21b obtains voice data from the reply message from the person D2 (step S302), and analyzes the voice of the person D2. Thereby, the voice recognizer 21b recognizes that the voice of the person D2 is not Japanese (step S303, No). In this case, the voice recognizer 21b recognizes that the voice of the person D2 is English. Then, the conversation controller 40b obtains information which indicates that the voice is English.

Thereby, the conversation controller 40b utters "I have a delivery for you" in English under the control of the voice synthesizer 21a (step S306). When further reply message from the person D2 is obtained, the voice recognizer 21b analyzes the voice data on the assumption that the voice from the person D2 is English.

In this embodiment, an appropriate conversation with the person D2 is performed by the conversation controller 40b under the control of the voice synthesizer 21a. When the conversation with the person D2 is finished, the conversation controller 40b updates the data relating to the person D2 which is stored on the personal information database 3g, and terminates the processing in the subroutine 2 (step S7). Here, the updating of data relating to the person D2 is for example the data about the language the person D2 uses.

In the flowchart shown in FIG. 12, the operation determination unit 40c outputs the command, by which the robot R hands the object received from the person D1 to the person D2, to the autonomous travel controller 50 (step S112), when the processing in the subroutine 2 is terminated (step S111). Then, the conversation motion pattern is finished.

Here, the updating of the data relating to the person D2 stored on the personal information database 3g may be performed just after the recognition (step S303) of the voice message from the person D2.

In the above described embodiment, the explanations are given on the assumption that the language of the person is only two languages, e.g. Japanese and English. However, different languages may be adopted to handle the multilingual voice messages.

Although there have been disclosed what are the patent embodiment of the invention, it will be understood by person skilled in the art that variations and modifications may be made thereto without departing from the scope of the invention, which is indicated by the appended claims.

In the above described embodiment, a bipedal walking robot is used as an example of the mobile robot. But the robot which moves using different means, such as the robot with a plurality of legs or the robot with tires, may be adoptable as the mobile robot.

Adjustment of the start timing of the communication motion in accordance with the contents of the communication can be applied for the other communication motion, even when the robot performs the communication motion other than the communication motion which is performed when the robot passes by a person with greeting.

What is claimed is:

1. A mobile robot which receives a wireless signal transmitted from a tag on which identification information is stored, and communicates with a detection target provided with the tag by a predetermined motion of the mobile robot or by an utterance from the mobile robot, the mobile robot comprising:
    a personal identification unit which detects an existence of the tag and obtains the identification information based on the wireless signal transmitted from the tag;
    a position information acquisition unit which acquires distance information indicating a distance from the mobile robot to the detection target provided with the tag;
    a locomotion speed detection unit which detects a locomotion speed of the mobile robot;
    a personal information acquisition unit which acquires personal information based on the identification information obtained by the personal identification unit;
    a communication motion determination unit which determines contents of a communication motion for communicating with the detection target based on the personal information acquired by the personal information acquisition unit; and
    an operation determination unit which adjusts a start timing of each content of the communication motion based on the distance information indicating the distance from the mobile robot to the detection target provided with the tag and on the locomotion speed of the mobile robot detected by the locomotion speed detection unit.

2. A mobile robot according to claim 1, wherein
the personal information includes language information which indicates the language of the detection target provided with the tag, and the communication motion determination unit determines the contents of the communication motion based on the language information.

3. A mobile robot according to claim 2, wherein
the position information acquisition unit further acquires direction information indicating a direction from the mobile robot to the detection target, and wherein
the communication motion is started after directing sights of the mobile robot toward the direction acquired by the position information acquisition unit.

4. A mobile robot according to claim 1 further including:
a voice data input unit which inputs voice data; and a voice recognition unit which recognizes plural languages, wherein
the voice recognition unit specifies a language based on vocabularies recognized from the inputted voice data, and the communication motion determination unit determines the contents of the communication motion based on the specified language.

5. A mobile robot according to claim 4, wherein
the position information acquisition unit further acquires direction information indicating a direction from the mobile robot to the detection target, and wherein
the communication motion is started after directing sights of the mobile robot toward the direction acquired by the position information acquisition unit.

6. A mobile robot according to claim 1, wherein
the position information acquisition unit further acquires direction information indicating a direction from the mobile robot to the detection target, and wherein
the communication motion is started after directing sights of the mobile robot toward the direction acquired by the position information acquisition unit.

* * * * *